US012647295B2

(12) United States Patent
Mikuriya et al.

(10) Patent No.: US 12,647,295 B2
(45) Date of Patent: Jun. 2, 2026

(54) MANAGEMENT APPARATUS AND MANAGEMENT METHOD TO EXECUTE GROUP CALLS

(71) Applicant: JVCKENWOOD Corporation, Yokohama (JP)

(72) Inventors: Junichi Mikuriya, Yokohama (JP); Ichiro Shishido, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 97 days.

(21) Appl. No.: 18/610,367

(22) Filed: Mar. 20, 2024

(65) Prior Publication Data

US 2024/0223395 A1 Jul. 4, 2024

Related U.S. Application Data

(63) Continuation of application No. PCT/JP2022/030567, filed on Aug. 10, 2022.

(30) Foreign Application Priority Data

Sep. 21, 2021 (JP) ................................. 2021-153024

(51) Int. Cl.
*H04L 12/18* (2006.01)
(52) U.S. Cl.
CPC ...... *H04L 12/1831* (2013.01); *H04L 12/1818* (2013.01)
(58) Field of Classification Search
CPC ........................ H04L 12/1831; H04L 12/1818
See application file for complete search history.

(56) References Cited

U.S. PATENT DOCUMENTS

| | | | | | |
|---|---|---|---|---|---|
| 8,068,866 | B2 * | 11/2011 | Isobe | .................. | H04L 12/1822 |
| | | | | | 455/518 |
| 9,825,999 | B2 * | 11/2017 | Hamada | .............. | H04L 65/4038 |
| 10,756,912 | B2 * | 8/2020 | Balasaygun | ............ | G06F 16/27 |

(Continued)

FOREIGN PATENT DOCUMENTS

| | | | |
|---|---|---|---|
| JP | 2003-159760 A | 5/2003 |
| JP | 2005-190314 A | 7/2005 |

(Continued)

OTHER PUBLICATIONS

International Search Report for the corresponding PCT Application No. PCT/JP2022/030567 mailed Nov. 1, 2022, 4 pages.

(Continued)

*Primary Examiner* — Nazia Naoreen
(74) *Attorney, Agent, or Firm* — Shih IP Law Group, PLLC

(57) ABSTRACT

A system management apparatus manages a group call made between a plurality of terminal apparatuses. A storage stores a playback management information database that indicates, for each terminal apparatus concerned with the group call, a status of playback of recorded data in which the group call is recorded. A controller causes the terminal apparatus to play back the recorded data and updates the playback management information database in the storage in accordance with a playback request acquired from the terminal apparatus. A transmitter transmits the playback management information database read from the controller to the terminal apparatus.

12 Claims, 22 Drawing Sheets

(56)      References Cited

U.S. PATENT DOCUMENTS

| | | | |
|---|---|---|---|
| 11,140,358 B1 * | 10/2021 | Adcock .............. | H04N 21/4788 |
| 2009/0268905 A1 * | 10/2009 | Matsushima .... | H04N 21/44204 |
| | | | 726/30 |

FOREIGN PATENT DOCUMENTS

| | | |
|---|---|---|
| JP | 2014-072535 A | 4/2014 |
| JP | 2018-166001 A | 10/2018 |

OTHER PUBLICATIONS

International Preliminary Examination Report on Patentability (I) for the corresponding PCT Application No. PCT/ JP2022/030567 mailed Mar. 26, 2024, 10 pages.

* cited by examiner

FIG. 3

| GROUP ID | TERMINAL APPARATUS ID | USER NAME |
|---|---|---|
| 1 | 200-1 | USER A |
| | 200-2 | USER B |
| | 200-3 | USER C |
| | 200-4 | USER D |
| | 200-5 | USER E |
| | 200-6 | USER F |
| | 200-7 | USER G |
| 2 | 200-20 | USER H |
| | 200-21 | USER I |
| | 200-22 | USER J |
| 5 | 200-1 | USER A |
| | 200-2 | USER B |
| | 200-3 | USER C |

| CALL ID | GROUP ID | CALL START DATE AND TIME | CALL DURATION (SECONDS) | TERMINAL APPARATUS ID | USER NAME | PARTICIPATION FORM | PLAYBACK AUTHORITY | PLAYBACK INFORMATION | PLAYBACK METHOD | PLAYBACK DEADLINE | PLAYBACK DATA AND TIME | SOUND DATA URL |
|---|---|---|---|---|---|---|---|---|---|---|---|---|
| 1-A | 1 | yyyy/mm/dd/ hh:mm:ss | 10 | 200-1 | USER A | CALL ORIGINATION | NO | - | - | - | - | Url-1 |
| | | | | 200-2 | USER B | PARTICIPATION REFUSAL | NO | - | - | - | - | |
| | | | | 200-3 | USER C | PARTICIPATION | NO | - | - | - | - | |
| | | | | 200-4 | USER D | NON-RESPONSE | NO | - | - | - | - | |
| | | | | 200-5 | USER E | RECORDING | YES | UNPLAYED | - | yyyy/mm/dd/hh:mm:ss | - | |
| | | | | 200-6 | USER F | RECORDING | YES | UNPLAYED | - | yyyy/mm/dd/hh:mm:ss | - | |
| | | | | 200-7 | USER G | RECORDING | YES | UNPLAYED | - | yyyy/mm/dd/hh:mm:ss | - | |
| 1-B | 1 | yyyy/mm/dd/ hh:mm:ss | 120 | 200-1 | USER A | CALL ORIGINATION | NO | - | - | - | - | Url-2 |
| | | | | 200-2 | USER B | PARTICIPATION | NO | - | - | - | - | |
| | | | | 200-3 | USER C | PARTICIPATION | NO | - | - | - | - | |
| | | | | 200-4 | USER D | NON-RESPONSE | NO | - | - | - | - | |
| | | | | 200-5 | USER E | RECORDING | YES | PLAYED | 2X SPEED | yyyy/mm/dd/hh:mm:ss | yyyy/mm/dd/hh:mm:ss | |
| | | | | 200-6 | USER F | RECORDING | YES | PLAYED | NORMAL PLAYBACK | yyyy/mm/dd/hh:mm:ss | yyyy/mm/dd/hh:mm:ss | |
| | | | | 200-7 | USER G | RECORDING | YES | PLAYED | NORMAL PLAYBACK | yyyy/mm/dd/hh:mm:ss | - | |
| 2-A | 2 | yyyy/mm/dd/ hh:mm:ss | 30 | 200-20 | USER H | CALL ORIGINATION | NO | - | - | - | - | - |
| | | | | 200-21 | USER I | PARTICIPATION | NO | - | - | - | - | |
| | | | | 200-22 | USER J | PARTICIPATION | NO | - | - | - | - | |

| CALL ID | GROUP ID | CALL START DATE AND TIME | CALL DURATION (SECONDS) | TERMINAL APPARATUS ID | USER NAME | PARTICIPATION FORM | PLAYBACK AUTHORITY | PLAYBACK INFORMATION | PLAYBACK METHOD | PLAYBACK DEADLINE | PLAYBACK DATA AND TIME | SOUND DATA URL |
|---|---|---|---|---|---|---|---|---|---|---|---|---|
| 1-A | 1 | yyyy/mm/dd/hh:mm:ss | 60 | 200-1 | USER A | CALL ORIGINATION | NO | - | - | - | - | Uri-1 |
| | | | | 200-2 | USER B | PARTICIPATION REFUSAL | NO | - | - | - | - | |
| | | | | 200-3 | USER C | PARTICIPATION | NO | - | - | - | - | |
| | | | | 200-4 | USER D | NON-RESPONSE | NO | - | - | - | - | |
| | | | | 200-5 | USER E | RECORDING | YES | PLAYED | 2X SPEED | yyyy/mm/dd/hh:mm:ss | yyyy/mm/dd/hh:mm:ss | |
| | | | | 200-6 | USER F | RECORDING | YES | PARTIALLY PLAYED THIRTY SECONDS | NORMAL PLAYBACK | yyyy/mm/dd/hh:mm:ss | - | |
| | | | | 200-7 | USER G | RECORDING | YES | UNPLAYED | - | yyyy/mm/dd/hh:mm:ss | - | |
| 1-B | 1 | yyyy/mm/dd/hh:mm:ss | 120 | 200-1 | USER A | CALL ORIGINATION | NO | - | - | - | - | Uri-2 |
| | | | | 200-2 | USER B | PARTICIPATION | NO | - | - | - | - | |
| | | | | 200-3 | USER C | PARTICIPATION | NO | - | - | - | - | |
| | | | | 200-4 | USER D | NON-RESPONSE | NO | - | - | - | - | |
| | | | | 200-5 | USER E | RECORDING | YES | PLAYED | 2X SPEED | yyyy/mm/dd/hh:mm:ss | yyyy/mm/dd/hh:mm:ss | |
| | | | | 200-6 | USER F | RECORDING | YES | PLAYED | NORMAL PLAYBACK | yyyy/mm/dd/hh:mm:ss | yyyy/mm/dd/hh:mm:ss | |
| | | | | 200-7 | USER G | RECORDING | YES | PLAYED | NORMAL PLAYBACK | yyyy/mm/dd/hh:mm:ss | - | |
| 2-A | 2 | yyyy/mm/dd/hh:mm:ss | 30 | 200-20 | USER H | CALL ORIGINATION | NO | - | - | - | - | - |
| | | | | 200-21 | USER I | PARTICIPATION | NO | - | - | - | - | |
| | | | | 200-22 | USER J | PARTICIPATION | NO | - | - | - | - | |

| CALL ID | CALL START DATE AND TIME | CALL DURATION (SECONDS) | GROUP ID | TERMINAL APPARATUS ID | USER NAME | PARTICIPATION FORM | PLAYBACK AUTHORITY | PLAYBACK INFORMATION | PLAYBACK METHOD | PLAYBACK DEADLINE | PLAYBACK DATA AND TIME |
|---|---|---|---|---|---|---|---|---|---|---|---|
| 1-A | yyyy/mm/dd/ hh:mm:ss | 60 | 1 | 200-1 | USER A | CALL ORIGINATION | NO | - | - | - | - |
| | | | | 200-2 | USER B | PARTICIPATION REFUSAL | NO | - | - | - | - |
| | | | | 200-3 | USER C | PARTICIPATION | NO | - | - | - | - |
| | | | | 200-4 | USER D | NON-RESPONSE | NO | - | - | - | - |
| | | | | 200-5 | USER E | RECORDING | YES | PLAYED | 2X SPEED | yyyy/mm/dd/hh:mm:ss | yyyy/mm/dd/hh:mm:ss |
| | | | | 200-6 | USER F | RECORDING | YES | PARTIALLY PLAYED THIRTY SECONDS | NORMAL PLAYBACK | yyyy/mm/dd/hh:mm:ss | - |
| | | | | 200-7 | USER G | RECORDING | YES | UNPLAYED | - | yyyy/mm/dd/hh:mm:ss | - |
| 1-B | yyyy/mm/dd/ hh:mm:ss | 120 | 1 | 200-1 | USER A | CALL ORIGINATION | NO | - | - | - | - |
| | | | | 200-2 | USER B | PARTICIPATION | NO | - | - | - | - |
| | | | | 200-3 | USER C | PARTICIPATION | NO | - | - | - | - |
| | | | | 200-4 | USER D | NON-RESPONSE | NO | - | - | - | - |
| | | | | 200-5 | USER E | RECORDING | YES | PLAYED | 2X SPEED | yyyy/mm/dd/hh:mm:ss | yyyy/mm/dd/hh:mm:ss |
| | | | | 200-6 | USER F | RECORDING | YES | PLAYED | NORMAL PLAYBACK | yyyy/mm/dd/hh:mm:ss | yyyy/mm/dd/hh:mm:ss |
| | | | | 200-7 | USER G | RECORDING | YES | PLAYED | NORMAL PLAYBACK | yyyy/mm/dd/hh:mm:ss | yyyy/mm/dd/hh:mm:ss |

234

F I G. 8
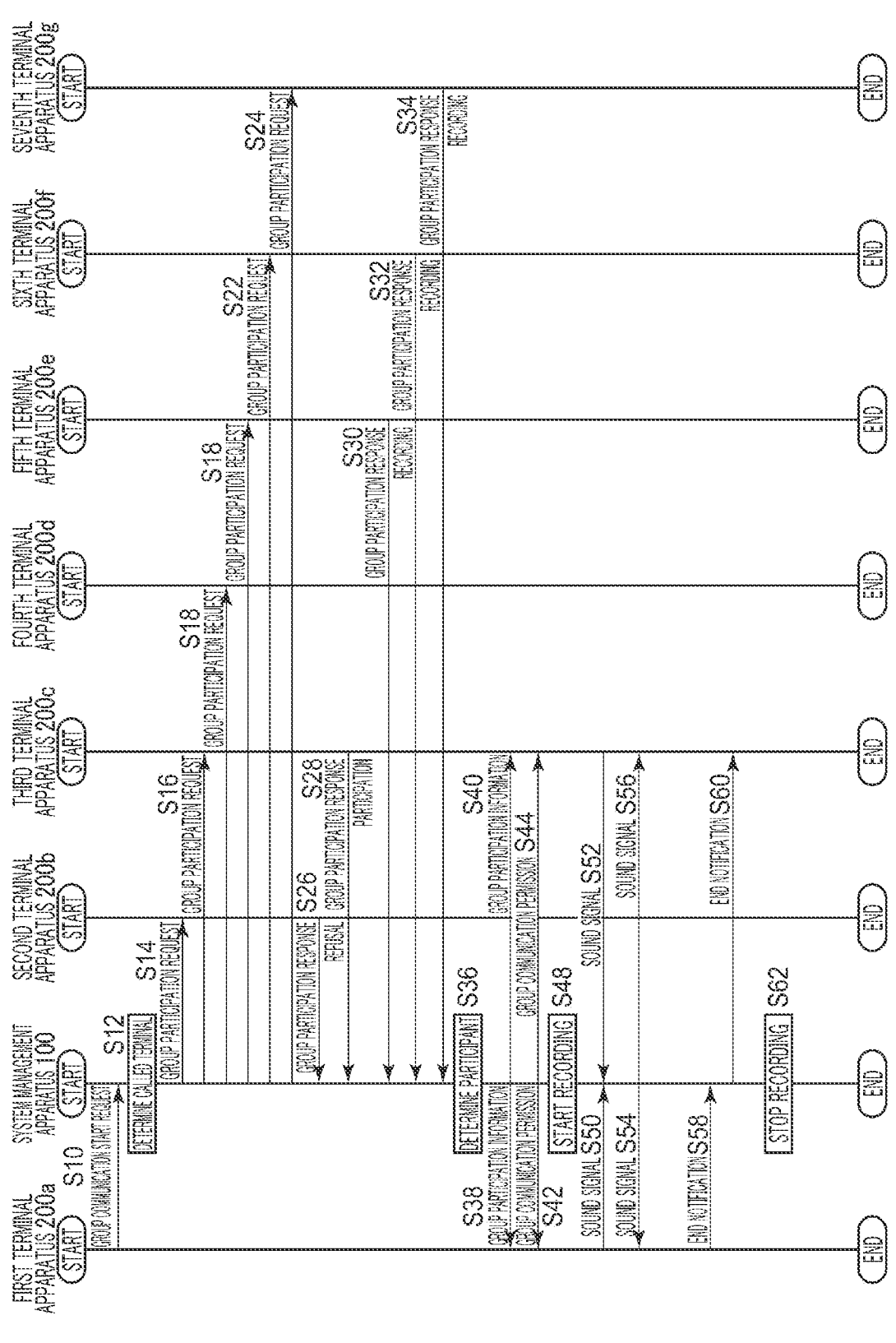

GROUP PARTICIPATION REQUEST SCREEN

A REQUEST FOR PARTICIPATION IN THE GROUP CALL HAS BEEN RECEIVED FROM THE TERMINAL APPARATUS 200-1. FIVE PEOPLE (200-3, 200-4, 200-5, 200-6, 200-7) OTHER THAN YOURSELF HAVE REQUESTED PARTICIPATION. IN WHAT FORM WOULD YOU PARTICIPATE IN THIS GROUP CALL?

OPTIONS

1) PARTICIPATION

2) HEAR THE RECORDING LATER

3) DO NOT PARTICIPATE

Menu    OK

PLAYBACK MANAGEMENT INFORMATION UPDATE SCREEN
LATEST STATUS OF PARTICIPATION INFORMATION IS DISPLAYED.

CALL 1-A

CALL START DATE AND TIME     yyyy/mm/dd/hh:mm:ss

CALL DURATION                SIXTY SECONDS

GROUP ID                     1

| TERMINAL APPARATUS ID | USER NAME | PARTICIPATION FORM | PLAYBACK INFORMATION | PLAYBACK METHOD | PLAYBACK DEADLINE | PLAYBACK DATA AND TIME |
|---|---|---|---|---|---|---|
| 200-1 | USER A | CALL ORIGINATION | - | - | - | - |
| 200-2 | USER B | PARTICIPATION REFUSAL | - | - | - | - |
| 200-3 | USER C | PARTICIPATION | - | - | - | - |
| 200-4 | USER D | NON-RESPONSE | - | - | - | - |
| 200-5 | USER E | RECORDING | PLAYED | 2X SPEED | yyyy/mm/dd/ hh:mm:ss | - |
| 200-6 | USER F | RECORDING | PARTIALLY PLAYED: THIRTY SECONDS | NORMAL PLAYBACK | yyyy/mm/dd/ hh:mm:ss | yyyy/mm/dd/ hh:mm:ss |
| 200-7 | USER G | RECORDING | UNPLAYED | - | yyyy/mm/dd/ hh:mm:ss | - |

Menu          UPDATE

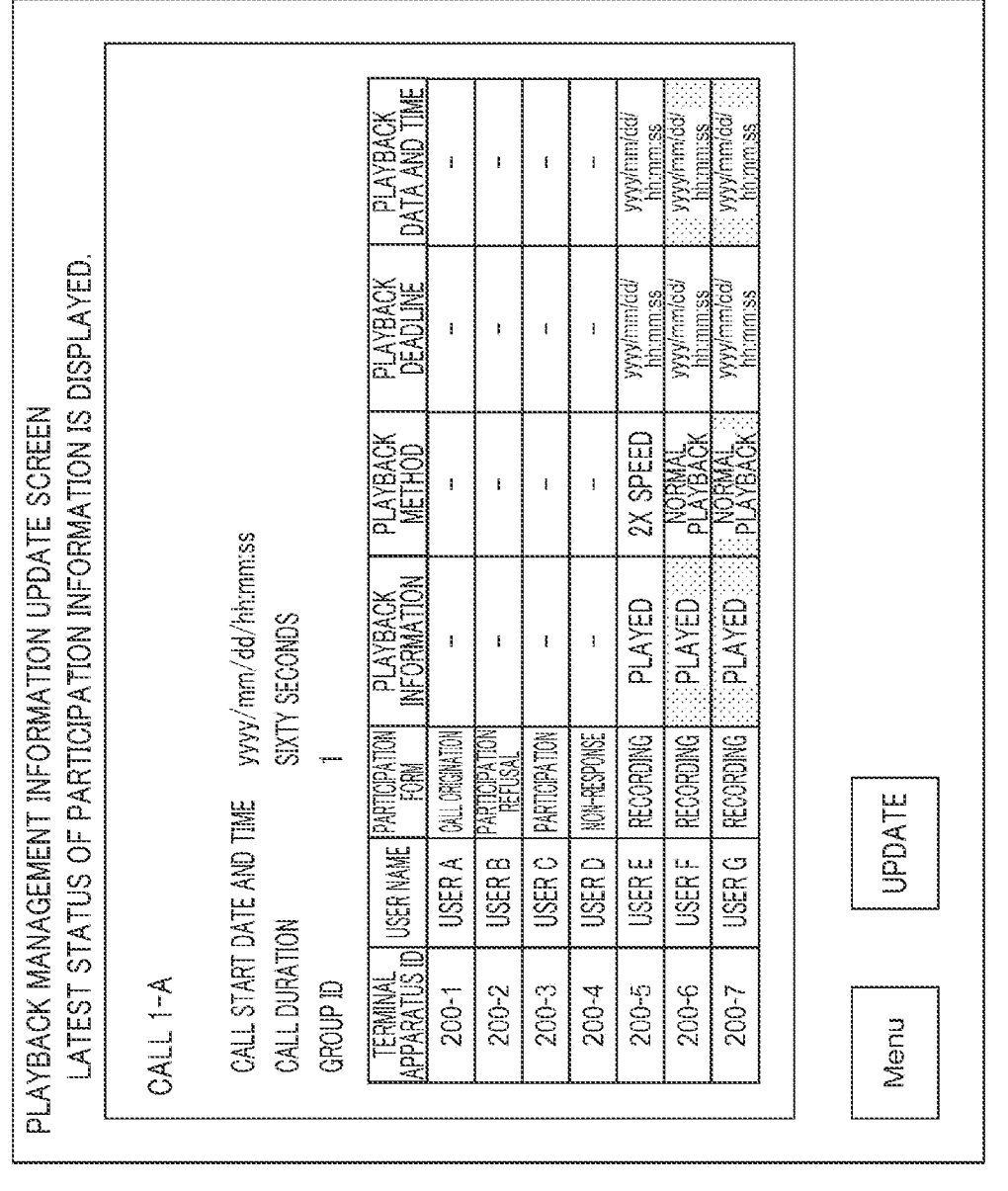

PLAYBACK MANAGEMENT INFORMATION UPDATE SCREEN
LATEST STATUS OF PARTICIPATION INFORMATION IS DISPLAYED.

CALL 1-A

CALL START DATE AND TIME    yyyy/mm/dd/hh:mm:ss
CALL DURATION    SIXTY SECONDS
GROUP ID    1

| TERMINAL APPARATUS ID | USER NAME | PARTICIPATION FORM | PLAYBACK INFORMATION | PLAYBACK METHOD | PLAYBACK DEADLINE | PLAYBACK DATA AND TIME |
|---|---|---|---|---|---|---|
| 200-1 | USER A | CALL ORIGINATION | - | - | - | - |
| 200-2 | USER B | PARTICIPATION REFUSAL | - | - | - | - |
| 200-3 | USER C | PARTICIPATION | - | - | - | - |
| 200-4 | USER D | NON-RESPONSE | - | - | - | - |
| 200-5 | USER E | RECORDING | PLAYED | 2X SPEED | yyyy/mm/dd/hh:mm:ss | yyyy/mm/dd/hh:mm:ss |
| 200-6 | USER F | RECORDING | PLAYED | NORMAL PLAYBACK | yyyy/mm/dd/hh:mm:ss | yyyy/mm/dd/hh:mm:ss |
| 200-7 | USER G | RECORDING | PLAYED | NORMAL PLAYBACK | yyyy/mm/dd/hh:mm:ss | yyyy/mm/dd/hh:mm:ss |

Menu    UPDATE

PLAYBACK MANAGEMENT INFORMATION UPDATE SCREEN

LATEST STATUS OF PARTICIPATION INFORMATION IS DISPLAYED.

CALL 1-A

CALL START DATE AND TIME    yyyy/mm/dd/hhmmss
CALL DURATION    TEN SECONDS
GROUP ID    1

| TERMINAL APPARATUS ID | USER NAME | PARTICIPATION FORM | PLAYBACK INFORMATION | PLAYBACK METHOD | PLAYBACK DEADLINE | PLAYBACK DATA AND TIME |
|---|---|---|---|---|---|---|
| 200-1 | USER A | CALL ORIGINATION | - | - | - | - |
| 200-2 | USER B | PARTICIPATION REFUSAL | - | - | - | - |
| 200-3 | USER C | PARTICIPATION | - | - | - | - |
| 200-4 | USER D | NON-RESPONSE | - | - | - | - |
| 200-5 | USER E | RECORDING | UNPLAYED | - | yyyy/mm/dd/ hh:mm:ss | - |
| 200-6 | USER F | RECORDING | UNPLAYED | - | yyyy/mm/dd/ hh:mm:ss | - |
| 200-7 | USER G | RECORDING | UNPLAYED | - | yyyy/mm/dd/ hh:mm:ss | - |

Menu    UPDATE

270

CALL 1-A
RECORDING PLAYBACK SCREEN

SELECT A METHOD OF PLAYING BACK THE CALL RECORDING AND
PRESS THE PLAYBACK BUTTON.

OPTIONS

1) NORMAL PLAYBACK 2) 2X SPEED PLAYBACK

3) TEXT PLAYBACK

Menu

PLAYBACK BUTTON

270

CALL 1-A
RECORDING PLAYBACK SCREEN

YOU DO NOT HAVE THE AUTHORITY TO
PLAY BACK THE RECORDING.

Menu

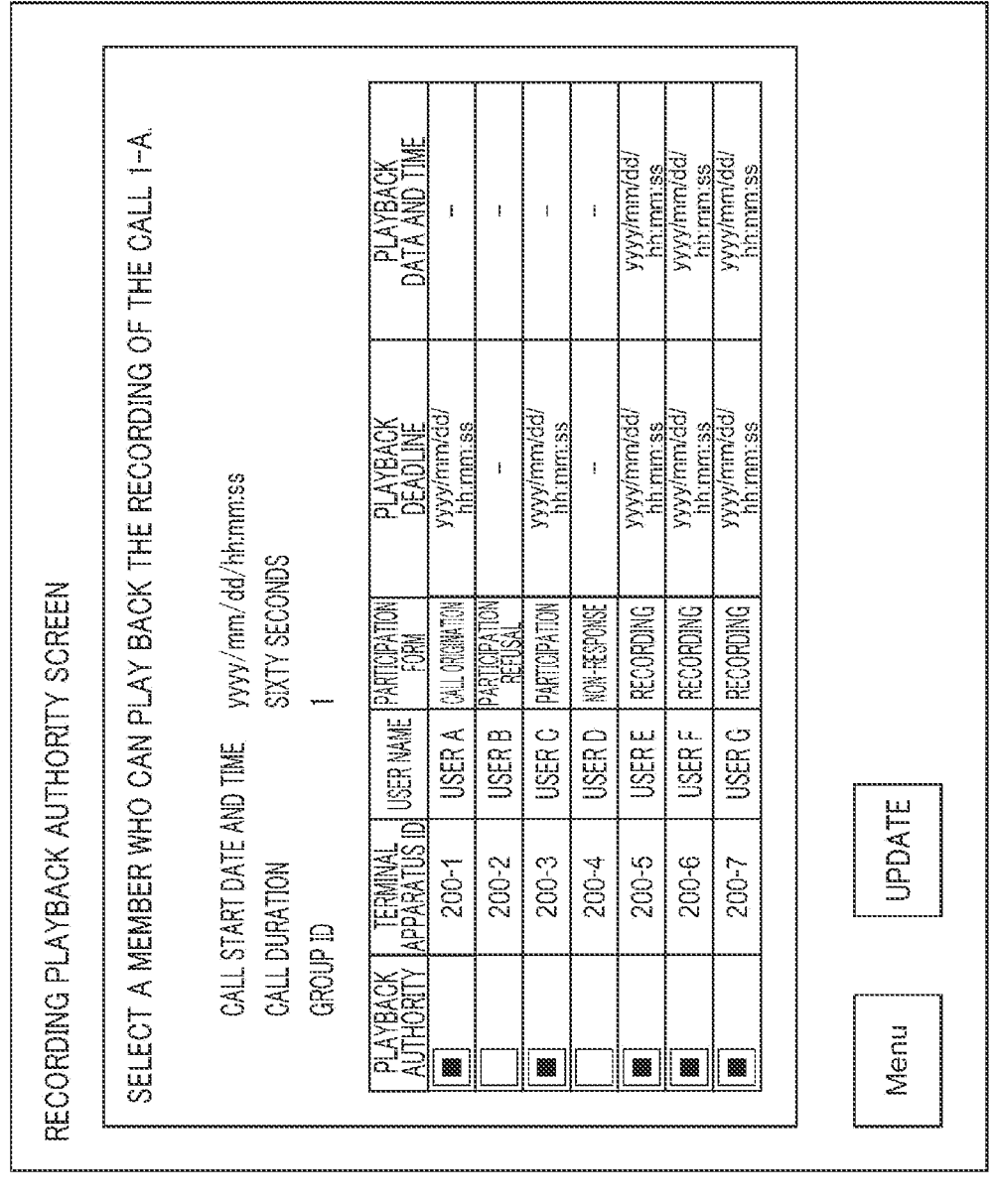

RECORDING PLAYBACK AUTHORITY SCREEN

SELECT A MEMBER WHO CAN PLAY BACK THE RECORDING OF THE CALL 1-A.

CALL START DATE AND TIME    yyyy/mm/dd/hh:mm:ss
CALL DURATION    SIXTY SECONDS
GROUP ID    1

| PLAYBACK AUTHORITY | TERMINAL APPARATUS ID | USER NAME | PARTICIPATION FORM | PLAYBACK DEADLINE | PLAYBACK DATA AND TIME |
|---|---|---|---|---|---|
| ▦ | 200-1 | USER A | CALL ORIGINATION | yyyy/mm/dd/ hh:mm:ss | - |
| ☐ | 200-2 | USER B | PARTICIPATION REFUSAL | - | - |
| ▦ | 200-3 | USER C | PARTICIPATION | yyyy/mm/dd/ hh:mm:ss | - |
| ☐ | 200-4 | USER D | NON-RESPONSE | - | - |
| ▦ | 200-5 | USER E | RECORDING | yyyy/mm/dd/ hh:mm:ss | yyyy/mm/dd/ hh:mm:ss |
| ▦ | 200-6 | USER F | RECORDING | yyyy/mm/dd/ hh:mm:ss | yyyy/mm/dd/ hh:mm:ss |
| ▦ | 200-7 | USER G | RECORDING | yyyy/mm/dd/ hh:mm:ss | yyyy/mm/dd/ hh:mm:ss |

Menu    UPDATE

Figure 20:
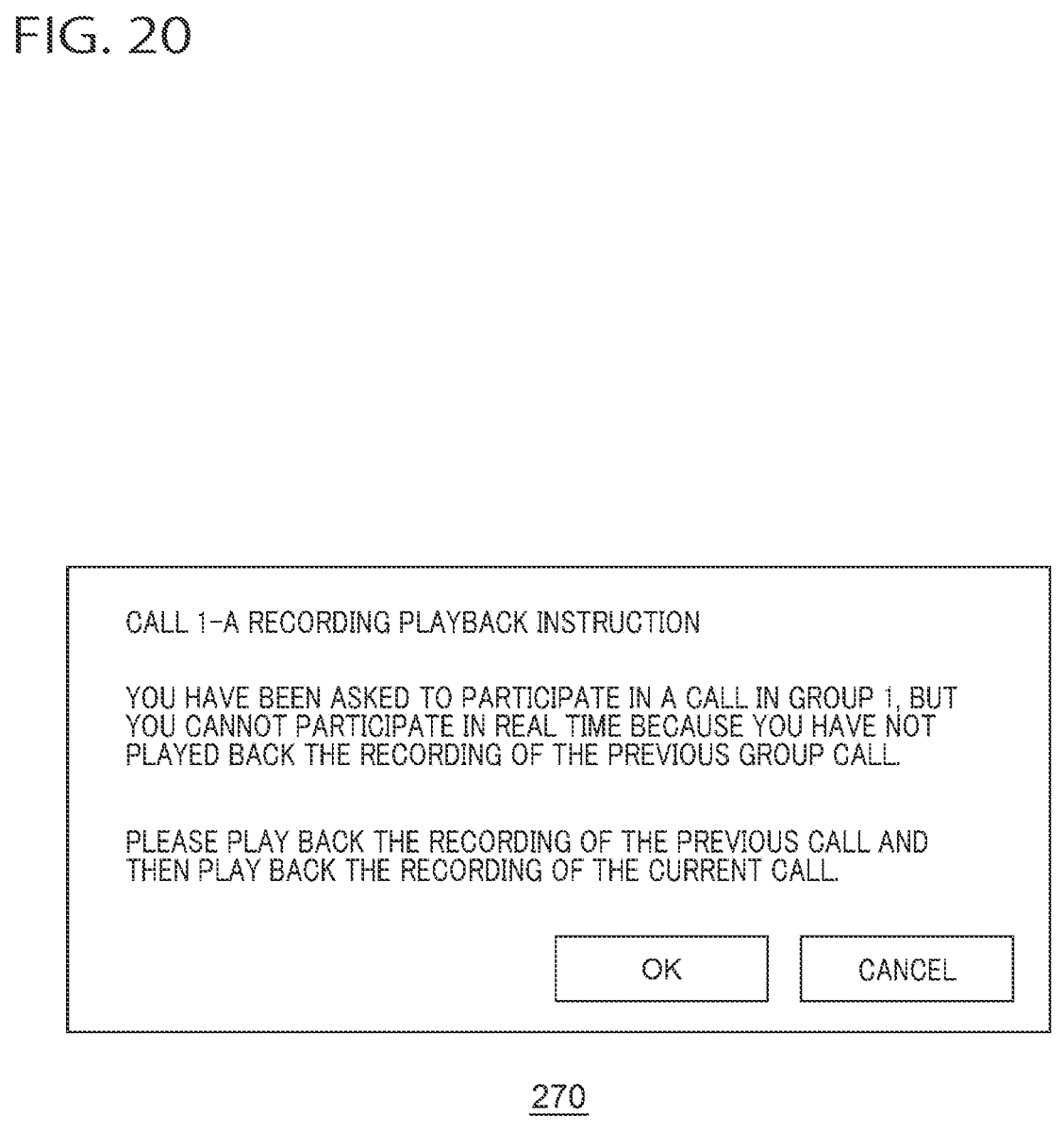

CALL 1-A RECORDING PLAYBACK INSTRUCTION

YOU HAVE BEEN ASKED TO PARTICIPATE IN A CALL IN GROUP 1, BUT
YOU CANNOT PARTICIPATE IN REAL TIME BECAUSE YOU HAVE NOT
PLAYED BACK THE RECORDING OF THE PREVIOUS GROUP CALL.

PLEASE PLAY BACK THE RECORDING OF THE PREVIOUS CALL AND
THEN PLAY BACK THE RECORDING OF THE CURRENT CALL.

| OK | CANCEL |

Figure 22:
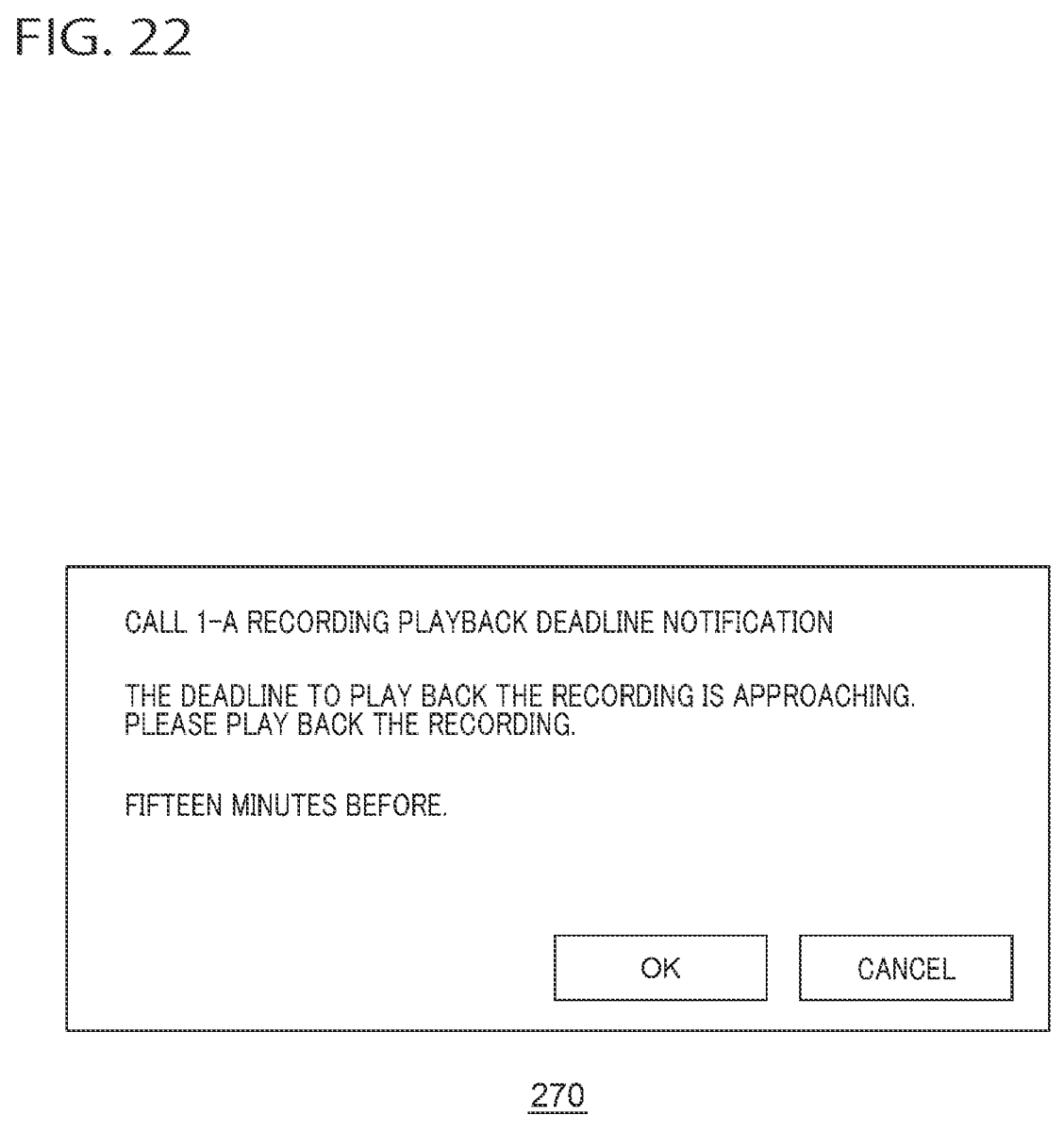

CALL 1-A RECORDING PLAYBACK DEADLINE NOTIFICATION

THE DEADLINE TO PLAY BACK THE RECORDING IS APPROACHING.
PLEASE PLAY BACK THE RECORDING.

FIFTEEN MINUTES BEFORE.

| OK | | CANCEL |

270

MANAGEMENT APPARATUS AND MANAGEMENT METHOD TO EXECUTE GROUP CALLS

CROSS-REFERENCE TO RELATED APPLICATION

This application is based upon and claims the benefit of priority from the prior Japanese Patent Application No. 2021-153024, filed on Sep. 21, 2021, the entire contents of which is incorporated herein by reference.

BACKGROUND

1. Field

The present disclosure relates to a communication technology and, more particularly, to a management apparatus and a management method to execute group calls.

2. Description of the Related Art

Group calls for calling a plurality of destination users are executed. In a group call, when, for example, the transmit button of the terminal apparatus is pressed, the terminal apparatus is granted the right to speak, and sound can be transmitted to other terminal apparatuses. There is also a technology to display, on the terminal apparatus, the participation status of members involved in the group call. There is also a technology to record a group call in the terminal apparatus (see, for example, Patent Literature 1).

[Patent Literature 1] JP2014-72535

In the related art, however it is not possible for other members to know who and when heard the recording of a group call. It is therefore difficult to know whether information in a group call is communicated to members of the group call. Therefore, a speaker cannot select a topic properly in the next group call and may need to repeat the same talk or check whether information is communicated to individual members, which is wasteful. Accordingly, the group call cannot be executed efficiently.

SUMMARY

A management apparatus according to an embodiment is a management apparatus adapted to manage a group call made between a plurality of terminal apparatuses, including: a storage that stores playback management information that indicates, for each terminal apparatus concerned with the group call, a status of playback of recorded data in which the group call is recorded; a controller that controls playback of the recorded data and updates the playback management information in the storage in accordance with a playback request acquired from the terminal apparatus; and a transmitter that transmits the playback management information read from the storage to the terminal apparatus. The controller acquires participation form information indicating a form of participation in the group call from the terminal apparatus concerned with the group call and includes the participation form information in the playback management information in the storage, and the participation form information is information that at least identifies a form of participating in the group call in real time, a form of playing back the recorded data after an end of the group call, or a form of not participating in the group call.

Another embodiment also relates to a management apparatus. The apparatus is a management apparatus adapted to manage a group call made between a plurality of terminal apparatuses, including: a storage that stores playback management information that indicates, for each terminal apparatus concerned with the group call, a status of playback of recorded data in which the group call is recorded; a controller that controls playback of the recorded data and updates the playback management information in the storage in accordance with a playback request acquired from the terminal apparatus; and a transmitter that transmits the playback management information read from the storage to the terminal apparatus. The playback management information includes information on a playback deadline to play back the recorded data, and the controller refers to the playback management information to extract a terminal apparatus that has not played back the recorded data by the playback deadline and prohibits the terminal apparatus thus extracted from participating in a group call made after the playback deadline.

Still another embodiment relates to a management method. The method is a management method adapted to manage a group call made between a plurality of terminal apparatuses, including: storing, in a memory, playback management information that indicates, for each terminal apparatus concerned with the group call, a status of playback of recorded data in which the group call is recorded; controlling playback of the recorded data and updating the playback management information in the memory in accordance with a playback request acquired from the terminal apparatus; and transmitting the playback management information read from the memory to the terminal apparatus. The updating acquires participation form information indicating a form of participation in the group call from the terminal apparatus concerned with the group call and includes the participation form information in the playback management information in the storage, and the participation form information is information that at least identifies a form of participating in the group call in real time, a form of playing back the recorded data after an end of the group call, or a form of not participating in the group call.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 shows a data structure of the terminal apparatus database of the system management apparatus;

FIG. 4 shows a data structure of the playback management information database of the system management apparatus;

FIG. 5 shows another data structure of the playback management information database of the system management apparatus;

FIG. 7 shows a data structure of the playback management information database of the terminal apparatus;

FIG. 8 is a sequence chart showing steps in a group call in the wireless communication system;

FIG. 11 shows a screen of group participation information displayed on the display unit of the terminal apparatus;

FIG. 12 shows another screen of group participation information displayed on the display unit of the terminal apparatus;

FIG. 13 shows yet another screen of group participation information displayed on the display unit of the terminal apparatus;

FIG. 18 shows a screen for authority change displayed on the display unit of the terminal apparatus;

FIG. 20 shows a screen for an incoming call displayed on the display unit of the fifth terminal apparatus;

FIG. 22 shows a screen to prompt playback displayed on the display unit of the terminal apparatus.

DETAILED DESCRIPTION

The invention will now be described by reference to the preferred embodiments. This does not intend to limit the scope of the present invention, but to exemplify the invention.

Embodiment 1

A detailed description will be given below of embodiments according to the present disclosure with reference to the drawings. It should be noted that the present disclosure is not limited by the embodiments. Where a plurality of embodiments are available, a combination of embodiments are encompassed. The embodiments of the present disclosure relate to a wireless communication system including a system management apparatus and a plurality of terminal apparatuses connected to a network.

Figure 1:
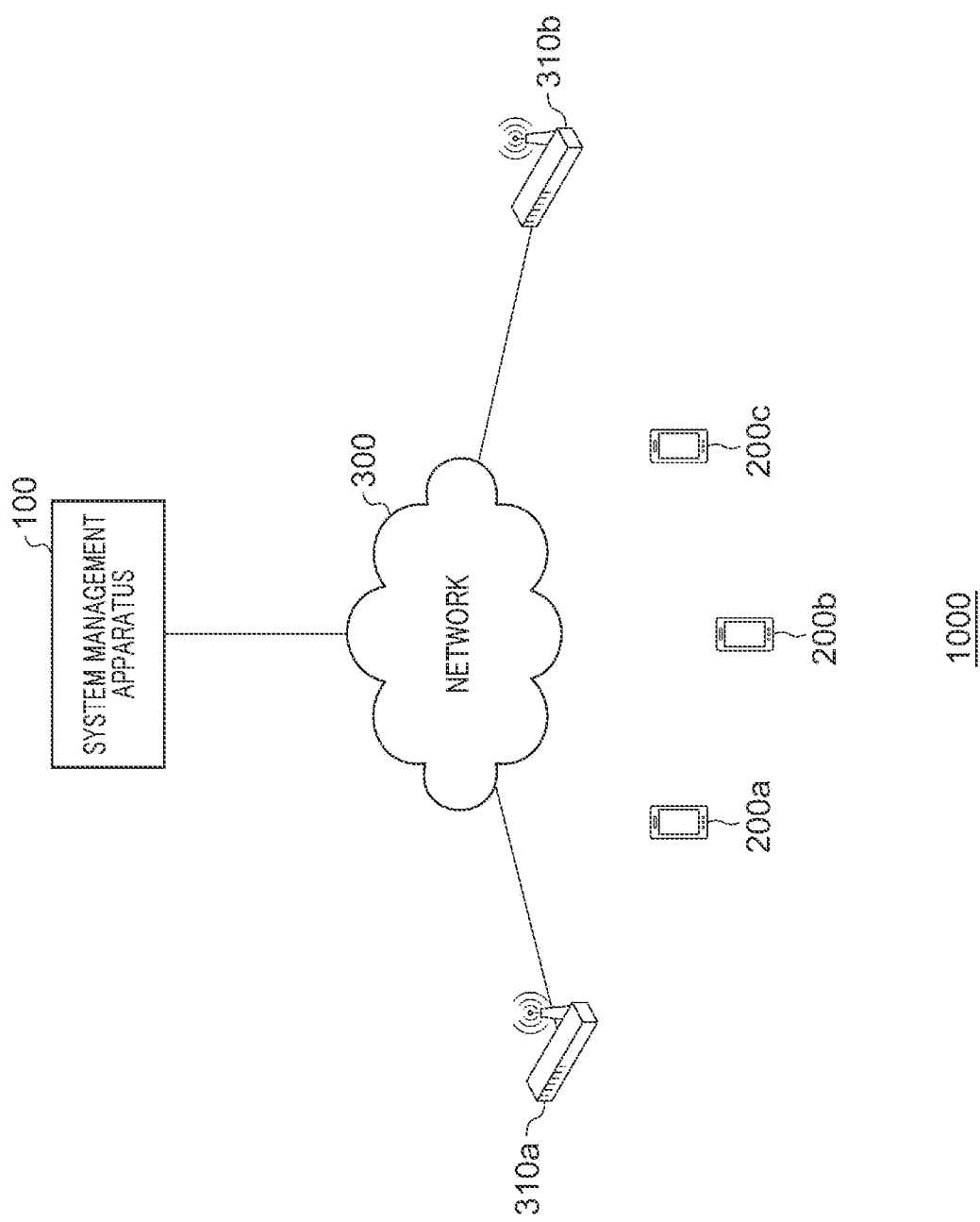
FIG. 1 shows a configuration of a wireless communication system according to embodiment 1.

FIG. 1 shows a configuration of a wireless communication system 1000. The wireless communication system 1000 includes a system management apparatus 100, a first terminal apparatus 200*a*, a second terminal apparatus 200*b*, a third terminal apparatus 200*c*, a network 300, a first wireless access point 310*a*, and a second wireless access point 310*b*. The wireless communication system 1000 shown in FIG. 1 is exemplary, and the number of terminal apparatuses 200 and the number of wireless access points 310 are not limited. Further, when it is not necessary to distinguish between the first terminal apparatus 200*a*, the second terminal apparatus 200*b*, and the third terminal apparatus 200*c* in the following description, they may be collectively referred to as the terminal apparatus 200. For the sake of simplicity of the drawings, FIG. 1 shows three terminal apparatuses 200, but more terminal apparatuses 200 may be used as necessary in the following description. Further, the first wireless access point 310*a* and the second wireless access point 310*b* may be collectively referred to as the wireless access point 310.

The network 300 is, but is not limited to, an IP (Internet Protocol) network that includes, for example, the Internet. The wireless access point 310 is connected to the network 300 and is connected to the system management apparatus 100 via the network 300. The wireless access point 310 is, for example, a base station apparatus of cellular phone, a base station apparatus of a land mobile radio system, an access point of a wireless LAN (Local Area Network), etc. The wireless access point 310 may be referred to as a base station apparatus.

The terminal apparatus 200 is a wireless apparatus capable of communicating with other terminal apparatuses 200 via the wireless access point 310 and the system management apparatus 100. Communication between the terminal apparatus 200 and the wireless access point 310 is, for example, a cellular phone line such as 4G or 5G or a wireless LAN, but may be another wireless communication scheme. The terminal apparatus 200 has the function of executing group communication between three or more terminal apparatuses 200. In the terminal apparatus 200, an application program is, for example, executed to execute a group call. Group communication is executed via the wireless access point 310, the network 300, and the system management apparatus 100. The system management apparatus 100 manages group communication that can be executed between a plurality of terminal apparatuses 200. In this embodiment, a group call that transmits sound will be described as an example of group communication, but the embodiment is not limited thereto. For example, group communication that transmits video, text, or other data between the terminal apparatuses 200 may be executed.

Hereinafter, the wireless communication system 1000 will be described in the order of (1) basic configuration, (2) group call process, (3) playback management information updating process, (4) sound data playback process, and (5) authority changing process.

(1) Basic Configuration

Figure 2:
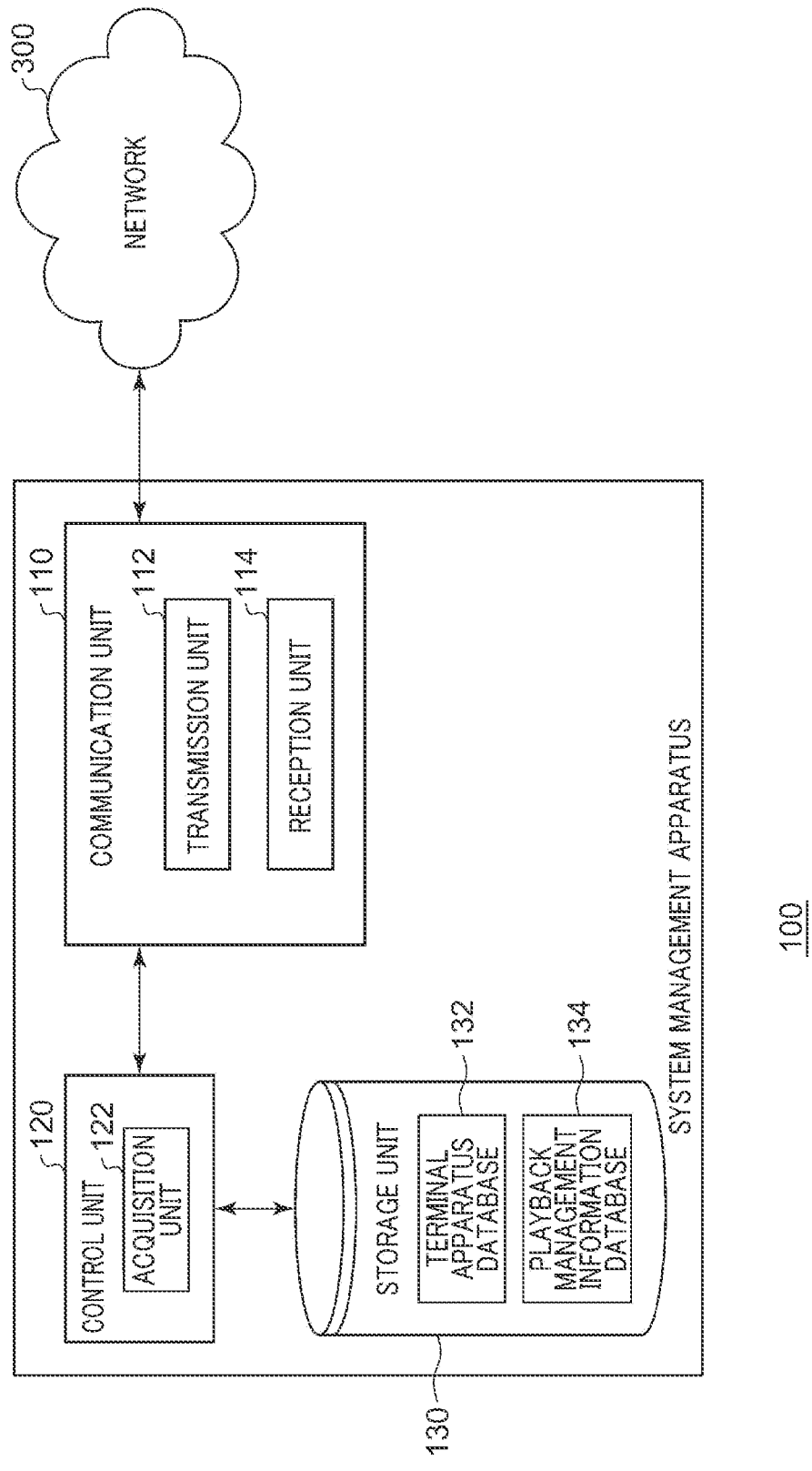
FIG. 2 shows a configuration of the system management apparatus.

FIG. 2 shows a configuration of the system management apparatus 100. The system management apparatus 100 includes a communication unit 110, a control unit 120, and a storage unit 130. The communication unit 110 includes a transmission unit 112 and a reception unit 114, and the control unit 120 includes an acquisition unit 122. The system management apparatus 100 is also referred to as a management apparatus.

The communication unit 110 is connected to the network 300 and executes communication with the terminal apparatus 200 via the network 300 and the wireless access point 310. In a communication with the terminal apparatus 200, the transmission unit 112 transmits a signal (data) to the terminal apparatus 200, and the reception unit 114 receives the signal (data) from the terminal apparatus 200. For example, the reception unit 114 receives a group communication start request, a group participation response, a sound signal, an end notification, etc. from the terminal apparatus 200 and outputs the received signal to the control unit 120. The group communication start request includes information (hereinafter referred to as "group ID") for identifying a group that executes group communication (group call in this embodiment).

The control unit 120 controls each part of the system management apparatus 100. The control unit 120 may be configured using a processor such as a CPU (Central Processing Unit), and the function of the control unit 120 may be realized by the processor executing a program (software) stored in the storage unit 130. Further, not only the control unit 120 but also each part of the system management apparatus 100 may be configured using a processor. The system management apparatus 100 may be comprised of a computer that includes one or more processors and a memory. The storage unit 130 is comprised of a semiconductor memory, an SSD (Solid State Drive), an HDD (Hard Disk Drive), etc. and stores various data and programs. At least a part of the storage unit 130 is comprised of a non-volatile storage medium so that data and programs are retained even when the power of the system management apparatus 100 is turned off. When the control unit 120 receives a group communication start request from the reception unit 114, the control unit 120 generates identification information (hereinafter referred to as "call ID") for uniquely identifying the call. The control unit 120 extracts the group ID from the group communication start request and searches a terminal apparatus database 132 in the storage unit 130 based on the group ID to acquire data related to the group involved in the group call (e.g., information on the terminal apparatus 20 belonging to the group).

FIG. 3 shows a data structure of the terminal apparatus database 132 stored in the storage unit 130 of the system management apparatus 100. In the terminal apparatus database 132, a "group ID", a "terminal apparatus ID", and a "user name" are associated. That is, the terminal apparatus database 132 includes information on the terminal apparatus 200 belonging to each group. Only one of the "terminal apparatus ID" and the "user name" may be stored. Further, the "user name" may be a "user ID" for identifying a user. One terminal apparatus 200 may belong to a plurality of groups. The terminal apparatus database 132 may store the type of terminal apparatus 200, although the feature is not shown. The terminal apparatus database 132 is also referred to as a group database. Reference is made back to FIG. 2. The control unit 120 transmits, via the transmission unit 112, "group participation request" information requesting participation in the group call to the terminal apparatus 200 concerned with the group call.

In response to the "group participation request", the control unit 120 acquires information indicating whether the terminal apparatus 200 participates in the group call and the form of participation in the group call (hereinafter referred to as "group participation response" or "response information") from each terminal apparatus 200 concerned with the group call via the reception unit 114. The control unit 120 generates group participation information based on the group participation response. The group participation information is information derived from extracting a portion of a playback management information database 134, described later, for a specific call subject to the process. The control unit 120 transmits group participation information to the terminal apparatus 200 belonging to the group via the transmission unit 112. Group participation information is also referred to as communication result information. The control unit 120 may have a function of recognizing the sound of a call and converting the sound into a text. As will be described later, the acquisition unit 122 acquires data necessary for the control unit 120 to generate group participation information.

The storage unit 130 stores various information described later in association with the call ID in the playback management information database 134 shown in FIG. 4. The playback management information database 134 includes various information related to playback of recorded sound in a group call. FIG. 4 shows a data structure of the playback management information database 134 of the system management apparatus 100 and shows an example of data at a point of time when the group call of the call ID "1-A" is made. This corresponds to the playback management information database 134 before the playback of the recording of the group call having the call ID "1-A". In the playback management information database 134, "call ID", "group ID", "call start date and time", "call duration", "terminal apparatus ID", "user name", "participation form", "playback authority", "playback information", "playback method", "playback deadline", "playback date and time", and "sound data URL" are associated.

The "call ID" is an ID for uniquely identifying a call assigned by the system management apparatus 100 at the start of the call. In the example shown in this figure, call IDs are "1-A", "1-B", and "2-A", but any number or character string may be used. "Group ID" is an ID for identifying a group to which the terminal apparatus 200 belongs. Not only the group to which the terminal apparatus 200 belongs, but also the group ID of the group to which the user belongs may be stored. "Call start date and time" is the date and time when the call is started. In the example shown in this figure, the date and time is stored in the format of "year/month/date/hour: minute: second" but may be in any storage format.

"Call duration" is the time taken from the start of the call to the end of the call. In the example shown in the figure, the call duration is recorded in seconds but the embodiment is not limited thereto. The call duration may be, for example, in milliseconds. Instead of or in addition to the call duration, the call end date and time may be stored in the same format as the call start date and time. "Terminal apparatus ID" is an ID for uniquely identifying the terminal apparatus 200 belonging to the group. The terminal apparatus 200 having the "terminal apparatus ID" of "200-1" is the first terminal apparatus 200a. The terminal apparatus 200 having the "terminal apparatus ID" of "200-2" is the second terminal apparatus 200b, and the same applies thereinafter. The "terminal apparatus ID" may be referred to as the "terminal ID". "User name" is information that identifies a user who uses the terminal apparatus 200. The user name may be indicated as a user ID. Referring to the terminal apparatus database 132 of FIG. 3, the relationship between the "terminal apparatus ID" and the "user name" can be easily acquired so that it is possible to omit the storage of either the "terminal apparatus ID" and the "user name".

In the "participation form" field, information indicating the participation status of each terminal apparatus 200 (each user) involved in the group call is stored. As the participation form, information (type) such as "call origination", "participation", "participation refusal", "non-response", and "recording" is, for example, stored. "Call origination" indicates the terminal apparatus 200 that started (originated) the group call. In the call ID "1-A", it is indicated that the first terminal apparatus 200a (terminal ID "200-1") has originated the group call. The participation form other than "call origination" is determined based on the group participation response received from the terminal apparatus 200 and recorded in the playback management information database 134. "Participation" indicates that the terminal apparatus receives the group participation request and participated in the group call in real time. That is, "participation" is recorded in the participation form field when the system management apparatus 100 receives a group participation response indicating participation from the terminal apparatus 200. In the call ID "1-A", it is indicated that the third terminal apparatus 200*c* (terminal ID "200-3") participated in the group call.

As will be described later, the terminal apparatus 200 that has received the group participation request can participate in the group call in real time when it sends a group participation response indicating acceptance of participation. Therefore, "participation" may also be referred to as "participation acceptance". Further, the terminal apparatus 200 participating in the group call in real time in a broad sense is the terminal apparatus 200 having a participation form of "call origination" or "participation". In the example of the call ID "1-A", therefore, the first terminal apparatus 200*a* and the third terminal apparatus 200*c* are terminal apparatuses 200 participating in a broad sense. The distinction between "call origination" and "participation" may be eliminated, and the type of terminal apparatus 200 that has originated the call may defined as "participation".

"Participation refusal" indicates that the user has explicitly refused to participate in the group call by a user operation in the terminal apparatus 200. That is, "participation refusal" is recorded in the participation form field when the system management apparatus 100 receives a group participation response indicating participation refusal from the terminal apparatus 200. In the call ID "1-A", it is indicated that the second terminal apparatus 200*b* (terminal ID "200-2") refused to participate in the group call. "Non-response" indicates that the terminal apparatus 200 did not transmit a group participation response within a predetermined time for a reason such as being out of the communication range or the user not noticing the incoming group call. That is, "non-response" is recorded in the participation form field when the system management apparatus 100 does not receive a group participation response from the terminal apparatus 200. In the call ID "1-A", it indicated that the fourth terminal apparatus 200*d* (terminal ID "200-4") was unresponsive. "Recording" indicates that the user does not participate in the group call in real time and requests, by a user operation in the terminal apparatus 200, the system management apparatus 100 to play back the recording later. That is, "recording" is recorded in the participation form field when the system management apparatus 100 receives a group participation response indicating recording from the terminal apparatus 200. In the call ID "1-A", it is indicated that the fifth terminal apparatus 200*e* (terminal ID "200-5"), the sixth terminal apparatus 200*f* (terminal ID "200-6"), and the seventh terminal apparatus 200*g* (terminal ID "200-7") have requested the recording of the group call.

Thus, at the start of the group call, the control unit 120 acquires a group participation response indicating the form of participation in the group call, i.e., participation form information, from the terminal apparatus 200 concerned with the group call and includes the participation form information in the playback management information database 134 of the storage unit 130. The participation form information is information that at least identifies a form of participating in the group call in real time, a form of playing back the recording (recorded sound data) after the end of the group call, or a form of not participating in the group call.

For example, information such as "Yes" and "No" is stored in the "playback authority" field. "Yes" indicates that the terminal apparatus 200 is authorized to play back the recording. "No" indicates that the terminal apparatus 200 is not authorized to play back the recording. "Yes" may be stored in the format of "1" or "Yes", and "No" may be memorized in the form of "0" or "No". Further, authorization to play back only a portion of the call (specific segment) may be granted. In a call with the call ID "1-A", it is indicated that the first terminal apparatus 200*a*, the second terminal apparatus 200*b*, the third terminal apparatus 200*c*, and the fourth terminal apparatus 200*d* are not authorized to play back the recording. "Playback information", "playback method", and "playback date and time" fields are fields that are registered when the recording is played back after the end of the call. FIG. 4 shows data at the time of the call so that the recording of the call ID "1-A" is not played back at all. For this reason, "unplayed" is recorded in the "playback information" of the terminal apparatus 200 having playback authority, and "-" indicating the initial value (unregistered) is recorded in the "playback information" of the terminal apparatus 200 without playback authority. In addition, "-" indicating the initial value (unregistered) is recorded in the "playback method" and "playback date and time" fields. Of course, not only "-" but also blank or "NULL" may be used as the initial value.

The "playback deadline" field contains information indicating the deadline date and time until which the recording can be played back. In the example shown in this figure, the information is stored in the format of "year/month/day hour: minute: second" but may be in any storage format. For the terminal apparatus 200 not having the authority to play back, "-" indicating irrelevancy. The playback deadline may be automatically set to a date and time after an elapse of a predetermined time since the call start date and time or the call end date and time. For example, "1 hour" or "24 hours" may be used as a predetermined time. Alternatively, in a group that regularly (e.g., once a day or once a week) holds group calls, for example, the playback deadline may be set to a point of time a predetermined time before (e.g., 1 hour before) the date and time when the next group call is scheduled to start. In such a case, the playback deadline may be set using a schedule (schedule data or schedule application) managed by the terminal apparatus 200 or the system management apparatus 100. Alternatively, the user of the specific terminal apparatus 200 (e.g., the user who originated the call) may set the playback deadline. The playback deadline may be the same for all terminal apparatuses 200, or a different date and time may be set for each terminal apparatus 200. For example, an earlier (shorter) playback deadline may be set in a new call for the terminal apparatus 200 (user) that has not played back the call recording by the playback deadline despite a selection of "recording" in a past group call. Further, a playback deadline later (longer) than normal may be set for the terminal apparatus 200 that has selected "recording" as the participation form and having a large number of calls that should be played back or the terminal apparatus 200 having a long call duration (playback time) of call(s) that should be played back.

In the "sound data URL" field, the URL (Uniform Resource Locator) of the sound data file, i.e., information indicating the location where the sound data file is stored is stored. It is indicated that the sound data file for the call 1-A is stored in the location of "Url-1". It is indicated that the sound data file for the call 1-B is stored in the location of "Url-2". For calls that do not have a sound data file, "-" is stored. Further, the sound data URL may be information indicating the location of recorded data other than sound data (e.g., video data) in which the call is recorded. In this embodiment, the call is not recorded in calls in which the terminal apparatus 200 having a participation form of "recording" does not exist, and so there may be calls for which a sound data file does not exist. For example, the call ID "2-A" is participated in real time by all the terminal apparatuses 200 concerned with the group call and so there is no sound data file, and "-" is stored in the sound data URL. However, the embodiment is not limited thereto. All calls may be recorded, and sound data files may be generated accordingly. The sound data file may be stored in an apparatus (such as a file server) different from the management apparatus. That is, the sound data URL may be information indicating a further apparatus instead of a location in the storage unit 130 of the system management apparatus 100.

FIG. 5 shows an example of data in the playback management information database 134 of the system management apparatus 100 at another point in time. FIG. 5 shows the playback management information database 134 at a point of time when at least a portion of the recording is played back by at least one terminal apparatus 200 after the group call of the call ID "1-A" ends. The description of the parts that remain unchanged from FIG. 4 is omitted. In the "playback information" field, for example, information such as "unplayed", "partially played", and "played" is stored. As described with reference to FIG. 4, "unplayed" is an initial value for the terminal apparatus 200 having playback authority and indicates a state in which the recording is not played back at all. "Partial played" indicates that a portion of the recorded call (partial call segment) has been played back. In the case of "partially played", the length of the segment played back or the length of the segment that remains to be played back is recorded such that the length is known. In the call ID "1-A", the playback information on the terminal apparatus ID "200-6" is shown as "partially played: thirty seconds". This indicates that "thirty seconds remain unplayed in the entire call". In other words, it indicates that "thirty seconds of the entire sixty seconds of the call have been played back, and the remaining thirty seconds have not been played back". The recording format of playback information is not limited to this. For example, the duration of the portion of the entire call that has been played back (e.g., "played back for twenty seconds") may be recorded. Further, information on a segment played back (playback start point and playback end point) may be recorded. For example, information such as "the segment from zero to twenty seconds after the start of the call is played back" may be recorded in a 60-second call may be recorded. Further, information on a plurality of playback segments may be recorded. For example, information such as "the segment from zero to ten seconds after the start and the segment from thirty to forty-five seconds after the start have been played back" may be recorded. "Played" indicates that the entirety of the recorded call (all call segments) has been played back. In the example shown in FIG. 5, it is shown that the fifth terminal apparatus 200e (terminal ID "200-5") has played back all call segments. By referring to the playback management information database 134, the control unit 120 can determine that the terminal apparatus 200 having the "playback information" set to "played" or "partially played" has played at least a portion of the call recording and that at least a portion of the call content is communicated to the user of the terminal apparatus 200. Further, the control unit 120 can determine that the terminal apparatus 200 having the "playback information" set to "unplayed" has not played back the call recording so that the call content is not communicated to the user of the terminal apparatus 200. Further, the control unit 120 can determine that the call content is not communicated to the user of the terminal apparatus 200 having the "participation form" set to "participation refusal" or "non-response".

In this embodiment, the terminal apparatus 200 in which the user did not select "recording" when receiving the group participation request is not authorized to play back the recording later, but the embodiment is not limited to this. For example, the terminal apparatus 200 that participated in the group call in real time and has a participation form of "call origination" and "participation" may be granted authority to play back the recording. Alternatively, the terminal apparatus 200 having a participation form other than "participation refusal" may, for example, be granted authority to play back the recording. In the absence of playback authority, "-" is used in the playback information, but "NULL" or a blank space may be stored.

In the "playback method" field, information such as "normal playback" (normal), "2× speed", and "text" are, for example, stored. "Normal playback" indicates that the recording was played back at a normal playback speed. "2× speed" indicates that the recording was played back at a playback speed twice as normal. In this case, the user can efficiently grasp the call content in a short time, but the possibility that the user does not understand the call content accurately (possibility of mishearing) increases when the call voice is unclear, when the call content is complicated, etc. "Text" indicates that the terminal apparatus 200 displayed text data derived from converting the call voice into a text using the voice recognition function provided in the control unit 120. That is, it indicates that the terminal apparatus 200 has played back the text data (recorded data) in which the call is recorded. In this case, the user can grasp the call content in an even shorter time and even more efficiently than at the 2× speed, but there is an increased possibility that the user does not accurately understand the call content when there is an error in voice recognition, etc. The embodiment is not limited to these playback methods. For example, a playback method such as "3× speed playback", "½× speed playback", and "sound playback with text (caption)" may be made available. In the example of FIG. 5, it is indicated that the fifth terminal apparatus 200e played back the recording at the 2× speed in the call ID "1-A". Further, it is indicated that the sixth terminal apparatus 200f has played back the recording normally (played back the recording at a normal speed). Furthermore, the seventh terminal apparatus 200g has not played back the recording so that the playback method remains the initial value "-".

The "playback date and time" field stores the date and time when the playback of the recording is completed. In the example shown in this figure, it is stored in the format of "year/month/day hour: minute: second" but may be in any storage format. For the terminal apparatus 200 not having the authority to play back the recording, "-" is stored. In the example shown in the figure, the playback date and time remains "-" when only a portion of the call recording is played back, but the embodiment is not limited to this. The playback date and time may be set when only a portion of the call recording is played back. In the example shown in the figure, there is one "playback date and time" field for each terminal apparatus 200. When the recording is played back a plurality of times, therefore, the last (most recent) playback date and time is recorded. However, the embodiment is not limited to this, and the playback information on a plurality of times of playback may all be recorded. For example, the playback method, the playback segment, and the playback date and time may be associated and recorded (additionally recorded) in the playback management information database 134 each time the recording is played back. That is, the playback history of each terminal apparatus 200 concerned with the call may be recorded in the playback management information database 134. Of course, when a segment of the call is played back in one playback session and the entire call is played back in multiple playback sessions, the playback information may be changed from "partially played" to "played". When the entire call is played back in three parts, for example, the playback information may be set to "partially played" at the time of the first and second playback sessions and may be set to "played" when the third playback session is completed.

Thus, the status of playback of the sound data for a record of the group call is recorded in the playback management information database 134 for each terminal apparatus 200 concerned with the group call. Further, the playback management information database 134 at least includes information indicating whether the sound data has been played back for each terminal apparatus 200 concerned with the group call. Further, the playback management information database 134 at least includes information on the playback date and time of the sound data for each terminal apparatus 200 concerned with the group call. That is, the playback management information database 134 is data in which the status of playback of recorded data for a record of a group call is indicated for each terminal apparatus 200 concerned with the group call. Reference is made back to FIG. 2.

When "recording" is included in the group participation response, the control unit 120 records the voice call, generates a sound data file (sound file), and registers the URL of the sound data file in the playback management information database 134 of the storage unit 130. The control unit 120 may store the sound data file in the storage unit 130 or may store it in another apparatus. Further, the control unit 120 may record all calls and register them in the playback management information database 134 regardless of the content of the group participation response. It will be noted that the sound data (recording data) that records the call is a type of recorded data in which the call is recorded.

In addition to the terminal apparatus database 132 and the playback management information database 134, the storage unit 130 stores various data and programs such as sound files that record the sound of a call. The sound file may be stored in a storage apparatus (such as a file server) separate from the system management apparatus 100 and capable of communication via the network 300.

Figure 6:
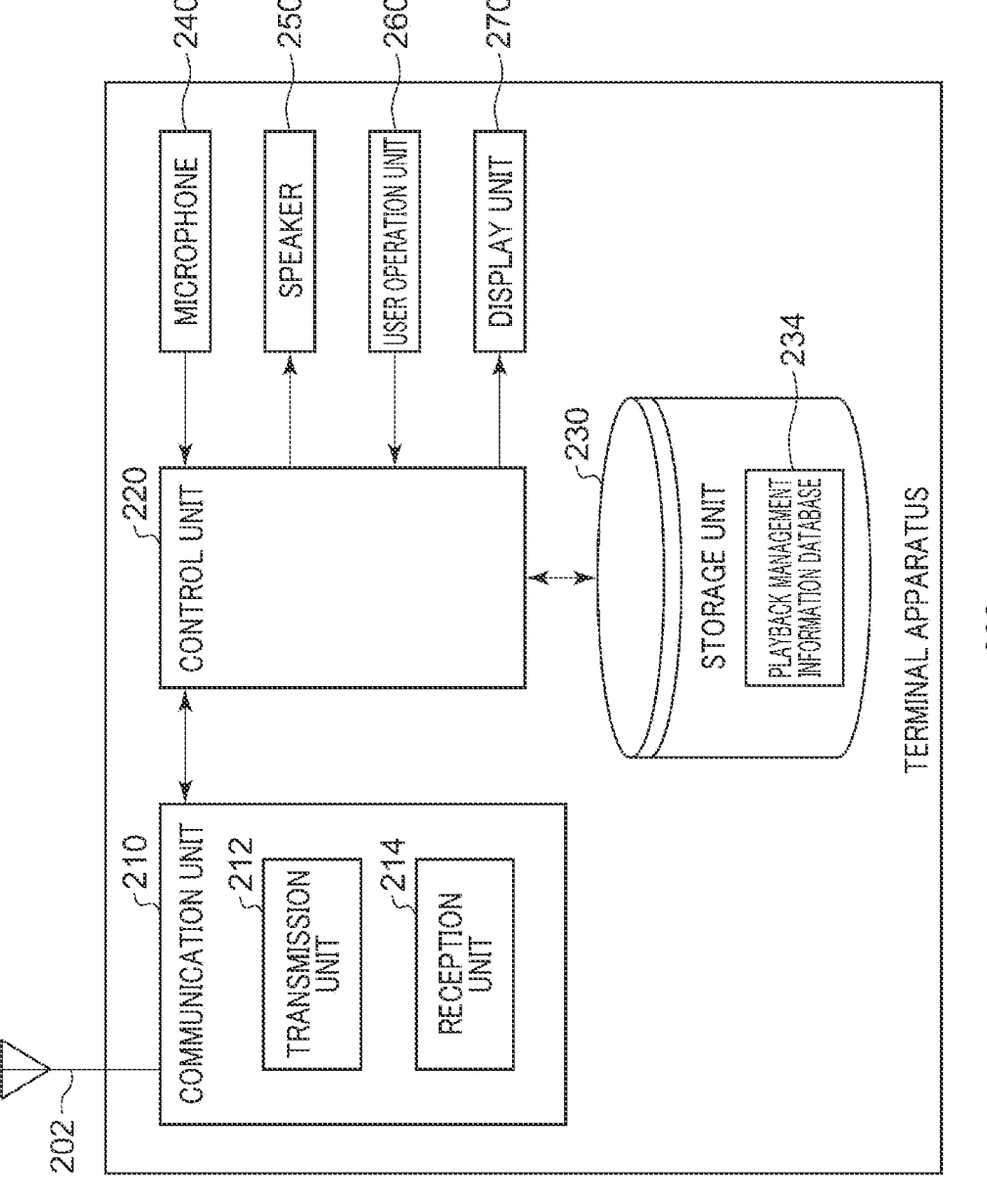
FIG. 6 shows a configuration of the terminal apparatus.

FIG. 6 shows a configuration of the terminal apparatus 200. The terminal apparatus 200 includes an antenna 202, a communication unit 210, a control unit 220, a storage unit 230, a microphone 240, a speaker 250, a user operation unit 260, and a display unit 270. The communication unit 210 includes a transmission unit 212 and a reception unit 214.

The microphone 240 (sound input unit) receives a sound from the user at the time of a call and converts the sound into a sound signal. The microphone 240 outputs the sound signal to the control unit 220. The speaker 250 (sound output unit) receives the sound signal from the control unit 220 at the time of a call, and outputs the sound signal as a sound. The speaker 250 may output a ringing tone, an alert sound, etc.

The user operation unit 260 is comprised of a button, a touch panel, etc., and receives an input from the user. The user operation unit 260 outputs the received input to the control unit 220. The display unit 270 receives an image and a message from the control unit 220 and displays them. The user operation unit 260 and the display unit 270 may be integrally configured by using a touch panel, etc. The display unit 270 may not be included in the terminal apparatus 200. For example, it is possible to connect an external apparatus (not shown) to the terminal apparatus 200 and configure the display apparatus thus connected to display the information. Similarly, the user operation unit 260 may not be included in the terminal apparatus 200. For example, it is possible to connect an input apparatus (not shown) such as an external button or keyboard to the terminal apparatus 200, and configure the input apparatus thus connected to receive a user operation.

The control unit 220 controls the parts of the terminal apparatus 200. The control unit 220 may be configured using a processor such as a CPU (Central Processing Unit), and the function of the control unit 220 may be realized by the causing the processor to execute a program (software) stored in the storage unit 230. Further, not only the control unit 220 but also each part of the terminal apparatus 200 may be configured using a processor. The terminal apparatus 200 may be comprised of a computer that includes one or more processors and a memory. Further, the control unit 220 causes the transmission unit 212 to transmit a registration request including terminal information (terminal apparatus ID, etc.) in order to use the wireless communication system 1000 when the power of the terminal apparatus 200 is turned on.

The transmission unit 212 is controlled by the control unit 220 to transmit various data. For example, the transmission unit 212 transmits the sound data for the call, the registration request, the group communication start request, the group participation response, etc. to the system management apparatus 100 via the wireless access point 310. The reception unit 214 is controlled by the control unit 220 to receive various data. For example, the reception unit 214 receives the sound data for the call, the group participation information, etc. The reception unit 214 also receives a group participation request from the system management apparatus 100 via the wireless access point 310 when a further terminal apparatus 200 starts a group call. When the reception unit 214 receives the group participation request, it outputs the request to the control unit 220. Based on the group participation request, the control unit 220 outputs the information included in the group participation request to the display unit 270.

When a group call occurs, the system management apparatus 100 transmits group participation information indicating the participation status of the members of the group call to the terminal apparatus 200 participating in the group call. The group participation information represents information derived from extracting a portion of the above-described playback management information (playback management information database 134) associated with a specific call (specific call ID). Therefore, the group participation information may be referred to as playback management information. Group participation information and playback management information may be used in the same meaning. The term group participation information may be used when the information on a specific call is referred to, and a collection of group participation information may be referred to as playback management information. When the reception unit 214 receives the group participation information, it outputs the information to the control unit 220. The control unit 220 stores the group participation information received from the system management apparatus 100 in the storage unit 230.

The storage unit 230 is comprised of a semiconductor memory, an SSD (Solid State Drive), or an HDD (Hard Disk Drive) and stores various data and programs. At least a part of the storage unit 230 is comprised of a non-volatile storage medium so that data and programs are retained even when the power of the terminal apparatus 200 is turned off. The storage unit 230 stores the group participation information on each terminal apparatus 200 as a playback management information database 234. That is, the playback management information database 234 is a database in which the terminal apparatus 200 records the group participation information received from the system management apparatus 100.

FIG. 7 shows a data structure of the playback management information database 234 of the terminal apparatus 200. The playback management information database 234 comprises data (history) in which the group participation information received by the terminal apparatus 200 from the system management apparatus 100 so far is additionally recorded. In the example shown in FIG. 7, the data for the call ID "1-B" executed by the terminal apparatus 200 in the past and the data for the call ID "1-A" currently executed are recorded. Since the group participation information received by the terminal apparatus 200 relates to a specific group to which the terminal apparatus 200 belongs, the playback management information database 234 represents an extract, from the playback management information database 134, of the data for the group to which the terminal apparatus 200 or the user of the terminal apparatus 200 belongs. In the example shown in the figure, the terminal apparatus 200 belongs to the group ID "1" so that the playback management information database 234 represents an extract, from the playback management information database 134 shown in FIG. 5, of the data for the group ID "1". Reference is made back to FIG. 6. The control unit 220 displays the information in the playback management information database 234 of the storage unit 230 on the display unit 27.

(2) Group Call Process

FIG. 8 is a sequence chart showing steps in a group call in the wireless communication system 1000. This represents a process in which, when the terminal apparatus 200 receives a call for a group call, the user executes a predetermined user operation to answer the type of participation (participation form) to the group call and transmits the information from the terminal apparatus 200 to the system management apparatus 100. FIG. 8 shows an example in which the first terminal apparatus 200a, which is a call originating terminal, and the second terminal apparatus 200b through the seventh terminal apparatus 200g, which are call incoming terminals, belong to the same group (group ID "1").

In step S10, the first terminal apparatus 200a transmits a group communication start request for starting a group call to the system management apparatus 100. The group communication start request includes information for identifying the group involved in the group communication (in this case, group ID "1") and information for identifying a call originating terminal (in this case, terminal ID "200-1"). In step S12, when the reception unit 114 of the system management apparatus 100 receives the group communication start request from the first terminal apparatus 200a, the control unit 120 refers to the terminal apparatus database 132 of the storage unit 130 to search for the terminal apparatus 200 to be called. This is equivalent to searching for the terminal apparatus 200 other than the call originating terminal belonging to the group. Specifically, of the terminal apparatuses 200 belonging to the group ID "1" in the terminal apparatus database 132 shown in FIG. 3, terminal IDs "200-2"-"200-7" that are the terminal apparatuses 200 other than the terminal ID "200-1" of the call originating terminal are yielded as search results. Based on the search results, the control unit 120 determines the terminal apparatus 200 (called terminal) that should be called, i.e., the terminal to which a group participation request should be delivered. In this case, the control unit 120 determines to transmit a group participation request to the second terminal apparatus 200b (terminal ID "200-2") through the seventh terminal apparatus 200g (terminal ID "200-7"). Since the call originating terminal and the called terminal are the terminal apparatuses 200 that execute the given group call, they may be referred to as the terminal apparatuses 200 concerned with the group call.

In steps S14 to S24, the transmission unit 112 transmits a group participation request to the second terminal apparatus 200b through the seventh terminal apparatus 200g. In this process, the control unit 120 activates a timer for determining whether the group call can be started. The wait time of the timer may be set to a predetermined time (e.g., twenty seconds), or may be set by the user of the first terminal apparatus 200a (call originating terminal).

Figure 9:
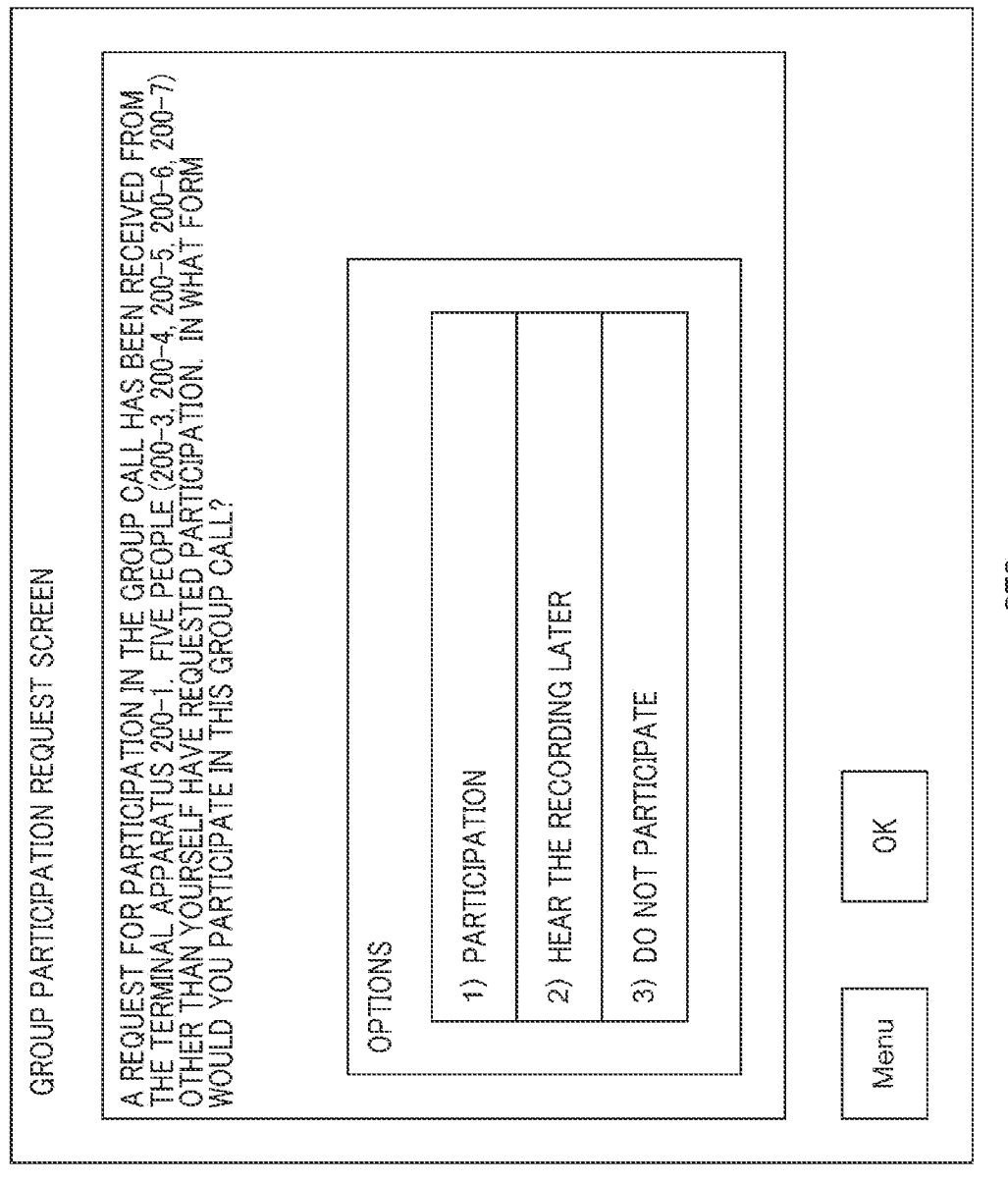
FIG. 9 shows a group participation request screen displayed on the display unit of the terminal apparatus.

When the communication unit 210 of the second terminal apparatus 200b through the seventh terminal apparatus 200g receives the group participation request, the control unit 220 displays a user operation screen (group participation request screen) on the display unit 270 to allow the user to designate a participation method (participation form). FIG. 9 shows a group participation request screen displayed on the display unit 270 of the terminal apparatus 200. In this figure, the message displayed in the second terminal apparatus 200b is shown by way of one example, but a similar message is shown in the third terminal apparatus 200c through the seventh terminal apparatus 200g.

For example, the group participation request screen includes a message such as "A request for participation in the group call has been received from the terminal apparatus 200-1. Five people (200-3, 200-4, 200-5, 200-6, 200-7) other than yourself have requested participation. In what form would you participate in this group call?". That is, the second terminal apparatus 200b displays information on the terminal apparatus 200 that requested participation in the group call and the other terminal apparatuses 200 that were requested to participate in the group call.

The user using the second terminal apparatus 200b responds by indicating whether to participate in the group call and the participation form according to the display screen. Specifically, the user selects "1) participate" and presses the OK button when the user participates in the group call in real time. The user selects "2) hear the recording later" and presses the OK button when the user hears the recording later without participating in real time. The user selects "3) do not participate" and presses the OK button when the user does not participate at all. "Participation" may be expressed as "real-time participation", "hear the recording later" may be expressed as "time-shifted participation". In this embodiment, only the user who selects "2) hear the recording later" can play the recording of the call. As described above, however, the recording may be made available for playback for the user who has selected another option. Reference is made back to FIG. 8.

In steps S26 to S34, the transmission unit 212 of the terminal apparatus 200 transmits a group participation response to the system management apparatus 100 according to the participation method designated by the user. The group participation response is also referred to as response information or response result. When "1) participate" is selected, the control unit 220 transmits a "group participation response (participation)", indicating that the form of participation in the group call is "participation", to the system management apparatus 100 via the transmission unit 212. When "2) recording" is selected, the control unit 220 transmits a "group participation response (recording)", indicating that the form of participation in the group call is "recording", to the system management apparatus 100 via the transmission unit 212. When "3) do not participate" is selected, the control unit 220 transmits a "group participation response (refusal)", indicating non-participation in the group call, to the system management apparatus 100 via the transmission unit 212. The second terminal apparatus 200*b* transmits a "group participation response (refusal)" to the system management apparatus 100. The third terminal apparatus 200*c* transmits a "group participation response (participation)" to the system management apparatus 100. The fifth terminal apparatus 200*e*, the sixth terminal apparatus 200*f*, and the seventh terminal apparatus 200*g* transmit a "group participation response (recording)" to the system management apparatus 100. The fourth terminal apparatus 200*d* does not transmit a group participation response.

In step S36, the acquisition unit 122 of the system management apparatus 100 acquires the group participation response from each terminal apparatus 200 via the communication unit 110. Further, if the acquisition unit 122 cannot acquire the group participation response from the terminal apparatus 200 within a predetermined time after the transmission of the group participation request, the acquisition unit 122 determines that the terminal apparatus 200 is unresponsive (no response). For example, the fourth terminal apparatus 200*d* is determined to be unresponsive. When the control unit 120 cannot receive a group participation response from a given terminal apparatus 200 within a predetermined time, the control unit 120 determines that the terminal apparatus 200 is an unresponsive terminal apparatus 200. Further, after the elapse of the respective timer time (predetermined time) in the timers activated in step S14-step S24, the control unit 120 confirms (determines) the participants (participating terminals) of the group call based on the group participation response (response information) from the terminal apparatuses 200 received up to that point of time. That is, the call originating terminal and the called terminals that have returned the group participation response (participation) within the predetermined time are determined as participating terminals participating in the group call (terminals participating in real time).

In the example shown in FIG. 8, the first terminal apparatus 200*a* (call originating terminal) and the third terminal apparatus 200*c* are participating terminals. The fourth terminal apparatus 200*d* has not transmitted a group participation response within the predetermined time and so is determined to be an unresponsive terminal apparatus 200 and is not a participating terminal. Further, the fifth terminal apparatus 200*e*, the sixth terminal apparatus 200*f*, and the seventh terminal apparatus 200*g* have returned a participation response (recording) are so are not participating terminals (terminals participating in real time). In this embodiment, the control unit 120 defines the participating terminal as being the terminal apparatus 200 not having the authority to play back the recording but may define it as the terminal apparatus 200 having playback authority. Further, the control unit 120 defines the unresponsive terminal apparatus 200*be* as the terminal apparatus 200 not having the authority to play back the recording but may define it as the terminal apparatus 200 having playback authority. Further, the control unit 120 defines the terminal apparatus 200 that refuses to participate as the terminal apparatus 200 not having playback authority but may define it as the terminal apparatus 200 having playback authority.

The control unit 120 generates group participation information once the participating terminals are confirmed in step S36. In that process, the acquisition unit 122 refers to the playback management information database 134 of the storage unit 130 and acquires data related to the call (call ID) to be processed. Specifically, the acquisition unit 122 acquires the call start date and time, the call duration, the terminal apparatus ID, the participation form, the playback information, the playback method, the playback deadline, and the playback date and time corresponding to a specific call ID from the playback management information database 134 (storage unit 130) and generates group participation information. The group participation information includes the same information as the playback management information database 234. The control unit 120 then transmits the group participation information to the terminal apparatus 200 via the communication unit 110. Referring to FIG. 8, the group participation information is transmitted to the first terminal apparatus 200*a* in step S38, and the group participation information is transmitted to the third terminal apparatus 200*c* in step S40.

The control unit 120 may generate group participation information (communication result information) at an arbitrary point of time (e.g., after the start of the group call or after the end of the group call) instead of proceeding as in step S36. Alternatively, the control unit 120 may generate group participation information at the point of time of reception of a request for group participation information from the terminal apparatus 200. The control unit 120 may transmit group participation information to the participating terminal at the start of the call or during the call. Alternatively, the control unit 120 may transmit group participation information to the terminal apparatus 200 having the authority to play back the recording at an arbitrary point of time, including the point of time when the terminal apparatus 200 processes a recording playback request. Still alternatively, the control unit 120 may transmit group participation information at an arbitrary point of time to any terminal apparatus 200 concerned with the group call. The control unit 120 may transmit updated group participation information when it receives a request to update the group participation information from the terminal apparatus 200. When the control unit 120 receives a request to update the group participation information from the terminal apparatus 200 whose participation form in the group call is "refusal" or "non-response", for example, the control unit 120 may transmit the group participation information to that terminal apparatus 200. That is, the system management apparatus 100 may transmit group participation information to the terminal apparatuses 200 concerned with the group call, including the terminal apparatus 200 that did not participate in the group call and the terminal apparatus 200 not having the authority to play back the recording. Further, the system management apparatus 100 may transmit group participation information to the terminal apparatus 200 (management terminal) of the operator, administrator, etc. of the wireless communication system 1000. That is, the system management apparatus 100 may transmit group participation information to the terminal apparatus 200 not concerned with a specific call. The group participation information updating process will be described later.

The reception unit 214 of the terminal apparatus 200 receives group participation information from the system management apparatus 100. The control unit 220 displays group participation information on the display unit 270.

After confirming the participating terminals, the control unit 120 of the system management apparatus 100 determines whether to start a group call based on the group participation response received from each terminal apparatus 200. For example, the control unit 120 determines "group call permission (group call start)" when the control unit 120 receives a predetermined number of group partici- pation responses (participation) or more and determines "group call non-permission (group call cancellation)" when the number of group participation responses (participation) is less than the predetermined number. The predetermined number may be an arbitrary value and may be, for example, 1. That is, there are two or more called terminals in a group call, but there may be one called terminals actually partici- pating in the group call, and a group call may be made between the two terminal apparatuses 200, i.e., the call originating terminal and the called terminal. Further, this predetermined number may be set by the user of the first terminal apparatus 200a. "Group call permission" may be called "group communication permission", and "group call non-permission" may be called "group communication non- permission". The control unit 120 notifies the participating terminals (the first terminal apparatus 200a and the third terminal apparatus 200c) of the result of determination on the start of a group call via the transmission unit 112. Referring to FIG. 8, the determination result is "group communication permission", and, in steps S42 and S44, the determination result of "group communication permission" is transmitted to the first terminal apparatus 200a and the third terminal apparatus 200c.

When the first terminal apparatus 200a and the third terminal apparatus 200c receive "group communication per- mission", they start a group call. For example, the ringing tone that had been output so far in the first terminal appa- ratus 200a is stopped. This allows the user using the first terminal apparatus 200a to recognize that communication is enabled (call origination enabled). When the first terminal apparatus 200a and the third terminal apparatus 200c receive "group communication non-permission", the first terminal apparatus 200a and the third terminal apparatus 200c display the information on the display unit 270 or output a sound indicating cancellation from the speaker 250 (sound output unit). For example, the ringing tone that had been output so far in the first terminal apparatus 200a is stopped, and an error tone is output. In this case, for example, a message such as "the group call will be canceled because the number of users participating in the group call is less than the predetermined number '3'" is displayed on the display unit 270 of the first terminal apparatus 200a. This allows the user to recognize the cancellation of the group call.

In step S48, the control unit 120 of the system manage- ment apparatus 100 starts recording after transmitting the result of determination on the start of a group call. When "group communication non-permission" is communicated instead of "group communication permission", recording will not start. Specifically, the control unit 120 starts gen- erating a sound data file of the call and stores the file in the storage unit 130. Alternatively, the control unit 120 may transmit sound data for the call to a further apparatus (recording server, file server, etc.), and cause the further apparatus to generate and store a sound data file.

In steps S50 to S56, the first terminal apparatus 200a and the third terminal apparatus 200c transmit a sound signal to the system management apparatus 100 when the first termi- nal apparatus 200a and the third terminal apparatus 200c are ready to start communication. The system management apparatus 100 transmits the sound signal received from the first terminal apparatus 200a to the third terminal apparatus 200c. Further, the system management apparatus 100 trans- mits the sound signal received from the third terminal apparatus 200c to the first terminal apparatus 200a. Thus, the sound signal is distributed to the participating terminals that transmitted the group participation response (participation)

to the system management apparatus 100. On the other hand, the sound signal is not transmitted to the second terminal apparatus 200b that transmitted the group participation response (refusal), the fourth terminal apparatus 200d that did not transmit the group participation response within the predetermined time, and the fifth terminal apparatus 200e, the sixth terminal apparatus 200f, and the seventh terminal apparatus 200g that transmitted the group participation response (recording).

In step S58, the first terminal apparatus 200a transmits an end notification to end the group call. The end notification may be transmitted from the third terminal apparatus 200c. When the system management apparatus 100 receives the end notification from the first terminal apparatus 200a, the system management apparatus 100 ends the group call by transmitting the end notification to the third terminal appa- ratus 200c in step S60. In step S62, the system management apparatus 100 stops recording when the group call ends.

Figure 10:
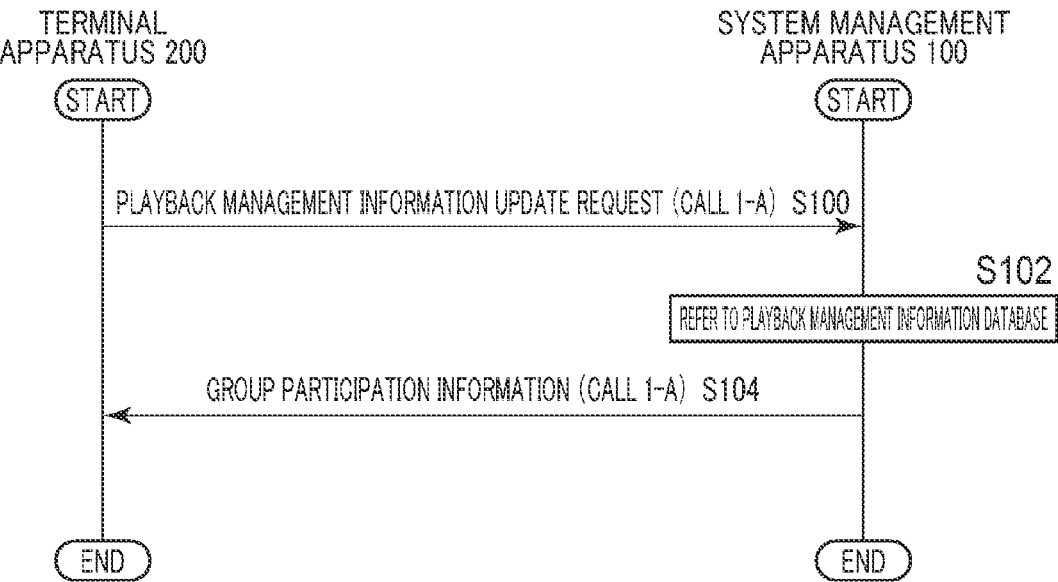
FIG. 10 is a sequence chart showing steps for updating the playback management information in the wireless communication system.

(3) Playback Management Information (Group Participation Information) Updating Process FIG. 10 is a sequence chart showing steps for updating the playback management information (group participation information) in the wireless communication system 1000. In this sequence, the terminal apparatus 200 concerned with the group call requests the latest playback management infor- mation from the system management apparatus 100, and the system management apparatus 100 accordingly executes a process of transmitting the latest playback management information to the terminal apparatus 200.

The user performs an operation in the terminal apparatus 200 to request an update to the playback management information (group participation information). FIG. 11 shows a user operation screen displayed on the display unit 270 of the terminal apparatus 200 for updating the playback management information. This shows an example of a screen displayed in the terminal apparatus 200 that requests an update to the playback management information on the call 1-A. The display unit 270 displays information related to the call ID "1-A" stored in the playback management information database 234. This is equivalent to displaying, based on the playback management information, a playback status at least indicating whether the sound data has been played back in each of the plurality of terminal apparatuses 200 concerned with the group call. Reference is made back to FIG. 10. In step S100, the control unit 220 transmits a playback management information update request for the call ID "1-A" to the system management apparatus 100 via the communication unit 210 when the user presses the "UPDATE" button. The playback management information update request is also referred to as a group participation information update request.

In step S102, when the reception unit 114 of the system management apparatus 100 receives a playback manage- ment information update request for the call ID "1-A", the acquisition unit 122 (control unit 120) refers to the playback management information database 134, acquires data for the designated call ID "1-A", and generates the group partici- pation information. In step S104, the transmission unit 112 transmits the "group participation information (call 1-A)" generated by the acquisition unit 122 to the terminal appa- ratus 200.

The reception unit 214 of the terminal apparatus 200 receives the updated (latest) group participation information on the call ID "1-A" from the system management apparatus 100, and the control unit 220 stores the group participation information in the playback management information data- base 234 of the storage unit 230. This is equivalent to receiving, from the system management apparatus 100 that manages the group call, the playback management information at least indicating whether each of the plurality of terminal apparatuses 200 concerned with the group call has played the sound data in which the group call is recorded. The old data for the call ID "1-A" stored in the playback management information database 234 is overwritten (updated) with the new data. The control unit 220 reads the latest playback management information from the playback management information database 234 and displays the information on the screen of the display unit 270.

FIG. 12 shows another screen displayed on the display unit 270 of the terminal apparatus 200. This is an example of the screen displayed by the terminal apparatus 200 that received the latest group participation information on the call 1-A. This is equivalent to displaying, based on the playback management information, a playback status at least indicating whether the sound data has been played back in each of the plurality of terminal apparatuses 200 concerned with the group call. The control unit 220 displays the updated portion of the received group participation information on the display unit 270, changing the display format thereof. For example, the background color of the "playback information" on the sixth terminal apparatus 200*f* and the seventh terminal apparatus 200*g* is dark, indicating that it has been updated to "played". Further, the background color of the "playback method" of the seventh terminal apparatus 200*g* is dark, indicating that it has been changed to normal playback. Further, the background color of the "playback date and time" of the recording in the sixth terminal apparatus 200*f* and the seventh terminal apparatus 200*g* is dark, indicating that these items of information are updated. That is, the display format of the group participation information may be changed. For example, the background color or character color of the updated portion (playback information, playback date and time, etc.) in the screen redisplayed in response to the reception of the group participation information may be changed in order to make it easier for the user to understand the difference from the user operation screen (FIG. 11) before the transmission of the playback management information update request. Of course, the change in the display format is not limited to changing the background color or the character color, but may be a change such as a change in the size of the character, a change in the decoration of the character, a change in the font, or a change in the icon. Further, the display format may be changed not only in the updated portion but also in a portion necessary to attract the attention of the user. When the playback information is "unplayed" or "partially played", for example, the display format of such a portion may be more highlighted than normal (conspicuous color, enlarged characters, blinking, etc.) in order to communicate to the user that further playback is necessary in an easy-to-understand manner.

The update method shown in FIG. 10 is only an example and the embodiment is not limited thereto. Even when the user does not make a playback management information update request, for example, the terminal apparatus 200 may periodically transmit a playback management information update request. Alternatively, the latest group participation information may be periodically transmitted from the system management apparatus 100 to the terminal apparatus 200. In particular, the latest group participation information may be transmitted from the system management apparatus 100 to the terminal apparatus 200 even while the group call is proceeding. FIG. 13 shows yet another screen showing group participation information (playback management information) displayed on the display unit 270 of the terminal apparatus 200. This is equivalent to the screen displayed while the group call is proceeding. In a comparison with FIG. 11, the playback information, the playback method, and the playback date and time are set to the initial values since the group call has not ended.

(4) Sound Data Playback Process

Figure 14:
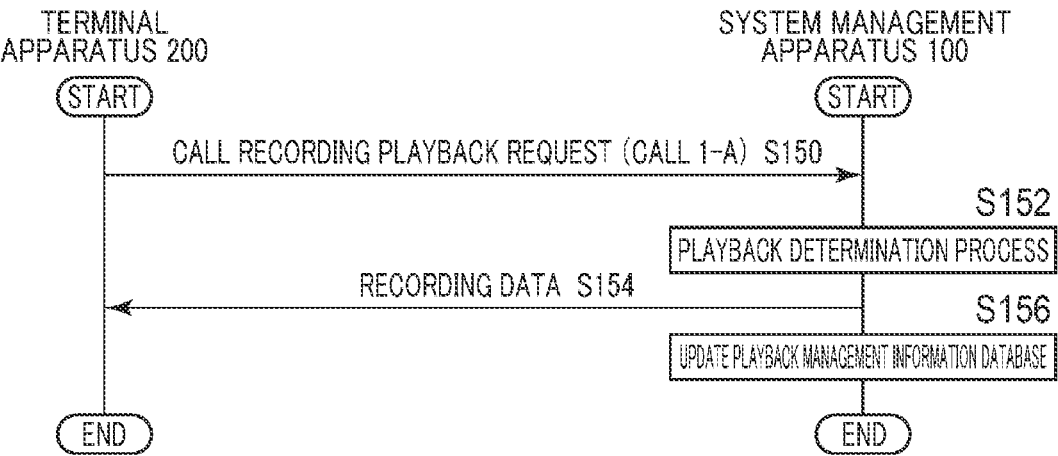
FIG. 14 is a sequence chart showing steps for playback in the wireless communication system.
Figure 15:
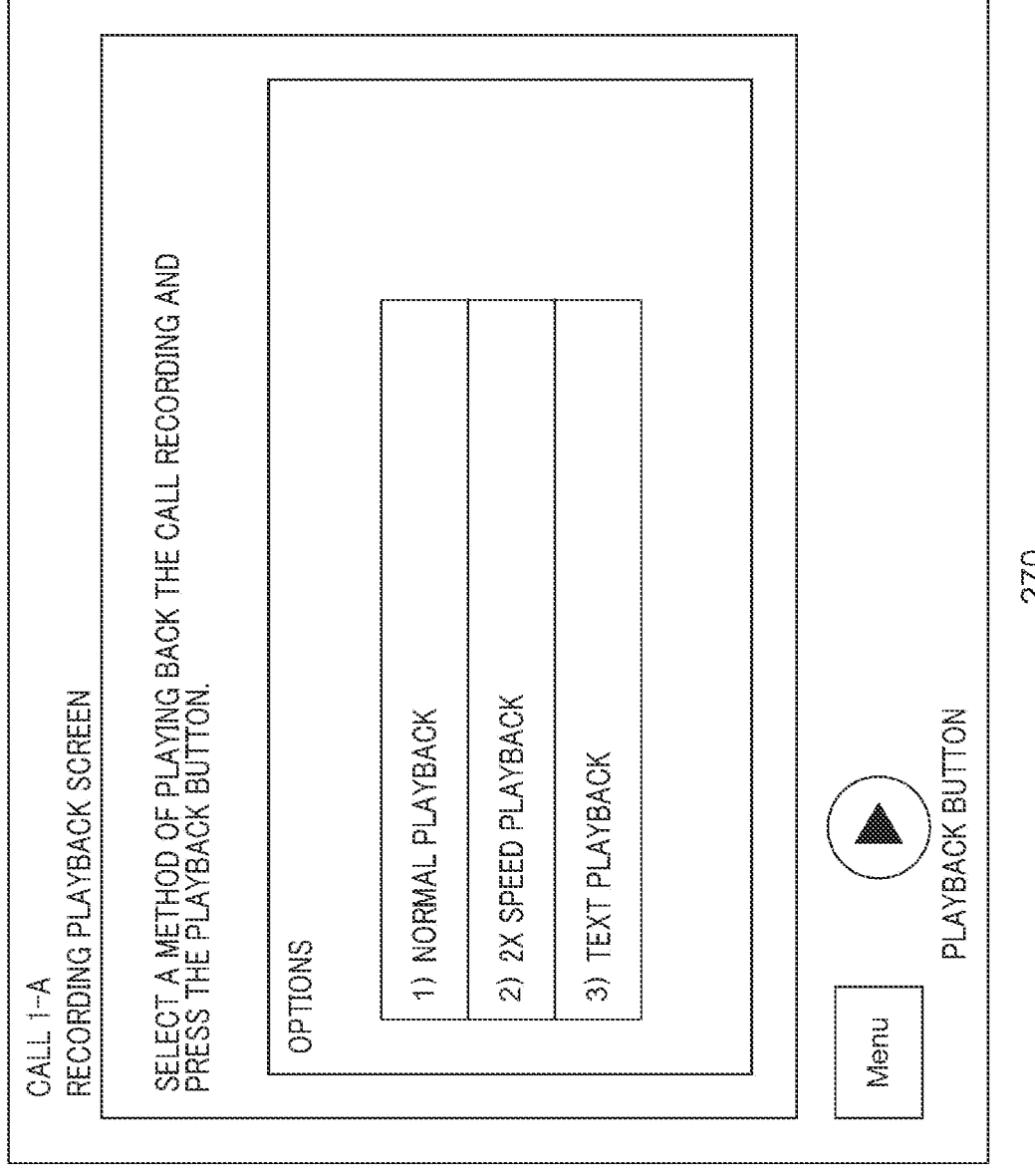
FIG. 15 shows a screen to play back the recording displayed on the display unit of the terminal apparatus.

FIG. 14 is a sequence chart showing steps of playing back the recording in the wireless communication system 1000. This indicates a process in which the terminal apparatus 200 requests the system management apparatus 100 to play back the call recording. The control unit 220 of the terminal apparatus 200 displays a screen to play back the recording on the display unit 270 in order to play back the recording. FIG. 15 shows a screen to play back the recording displayed on the display unit 270 of the terminal apparatus 200. This is an example of the user operation screen displayed by the display unit 270 in order to play back the recording of the call 1-A. As shown, a playback screen for selecting a method for playing back the call recording is shown. In the playback screen, for example, a message such as "select a method of playing back the call recording and press the playback button" is displayed. Options for the playback method include the "normal playback", "2× speed playback", and "text playback" described above. Of course, the embodiment is not limited to these options, and other options such as "3× speed playback", "½× speed playback", "sound playback with text (caption)", etc. may be displayed. Each area of the playback screen can be selected by the user using, for example, a touch panel provided in the display unit, i.e., the user operation unit 260 configured to be integrated with the display unit 270. The user selects a preferred playback method from the options and presses the playback button. The user may designate a playback segment, although the feature is omitted in this figure. For example, a slider, etc. may be displayed on the playback screen, and the user may be caused to designate a playback start point (e.g., ten seconds after the start of the call) and a playback end point (e.g., forty seconds after the start of the call) of the call recording to play back the segment between the points. Alternatively, the control unit 220 may refer to the playback information in the playback management information database 234 and automatically set a call segment not having been played back by the terminal apparatus 200 to be the playback segment. When the playback information is set to "unplayed", for example, the control unit 220 may set the playback start point at "zero seconds after the start of the call". When the playback information is set to "partially played", the control unit 220 may set the playback start point at "the beginning of the unplayed segment". Reference is made back to FIG. 14.

In step S150, the control unit 220 transmits a "call recording playback request (call 1-A, normal playback)" to the system management apparatus 100 via the transmission unit 212 when the user selects "normal playback" and presses the playback button. The "call recording playback request" is a message in which the terminal apparatus 200 requests playback of the recording and is also referred to as a "recording playback request" or a "playback request". The control unit 220 transmits a "call recording playback request (call 1-A, 2× speed playback)" to the system management apparatus 100 via the transmission unit 212 when the user selects "2× speed playback" and presses the playback button. The control unit 220 transmits a "call recording playback request (call 1-A, text playback)" to the system management apparatus 100 via the transmission unit 212 when the user selects "text playback" and presses the playback button. The "call recording playback request" message includes the terminal apparatus ID of the terminal apparatus 200 requesting playback, the call ID of the call to be played back, and information indicating the playback method. Further, the "call recording playback request" message may further include information indicating a playback segment.

In step S152, the control unit 120 executes a playback determination process when the reception unit 114 of the system management apparatus 100 receives the call recording playback request. That is, the control unit 120 determines whether to play back the call recording (recorded data in which the call is recorded) based on the playback management information database 134. When the recording should be played back, the control unit 120 determines a playback method. The playback determination process can be said to be a type of process that controls the playback of the recorded data in which the call is recorded (playback control process). Specifically, the control unit 120 first extracts the terminal apparatus ID and the call ID included in the call recording playback request. The control unit 120 then acquires information on "playback authority" and "playback deadline" of the requesting terminal apparatus 200 (terminal apparatus ID) relevant to the designated call ID from the playback management information database 134.

The control unit 120 then determines whether to permit the requesting terminal apparatus 200 to play back the recording. In other words, the control unit 120 determines whether the playback request satisfies a predetermined condition. Specifically, the control unit 120 determines to permit playback when the "playback authority" of the requesting terminal apparatus 200 is "Yes" and the point of time when the call recording playback request is received is before the "playback deadline". On the other hand, the control unit 120 determines not to permit playback (playback non-permission) when the "playback authority" of the requesting terminal apparatus 200 is "No" or when the point of time when the call recording playback request is received is after the "playback deadline". When playback is permitted, the control unit 120 refers to the sound data URL field of the playback management information database 134 and delivers (transmits) the recording data for the call 1-A to the terminal apparatus 200 via the transmission unit 112 in step S154. Alternatively, when the sound data URL indicates a further apparatus, the control unit 120 may instruct the other apparatus to transmit the recording data to the terminal apparatus 200. In any case, the control unit 120 executes, when playback is permitted, control (playback control) so that the recorded data in which the call is recorded is played back in the terminal apparatus 200. Further, the control unit 120 determines, when playback is permitted, a delivery method based on the playback method included in the call recording playback request. When the playback method is normal playback, the recorded sound data is delivered from the system management apparatus 100 to the terminal apparatus 200 as it is. In the case of 2× speed playback, the recorded sound data is delivered at 2× speed, and, in the case of text playback, text data derived from converting the sound data into a text using the voice recognition function is delivered to the terminal apparatus 200. These are equivalent to controlling the recorded data in which the call is recorded (playback control) to be played back in a playback form adapted to the request (call recording playback request) from the terminal apparatus 200. That is, the step whereby the control unit 120 determines that the playback request satisfies a predetermined condition and transmits the sound data to the terminal apparatus 200 by referring to the sound data URL data and transmits the text data derived from converting the sound data into a text to the terminal apparatus 200 is equivalent to playback control on the recorded data in which the call is recorded. Playing back the sound data in which the call is recorded and displaying the text data in which the call is recorded in the terminal apparatus 200 is equivalent to playing back the recorded data in which the call is recorded. The control unit 120 may convert the sound data into text data in advance and store the data in the storage unit 130 or a further apparatus such as a file server.

In step S156, the control unit 120 updates the playback management information database 134 in accordance with the call recording playback request. Specifically, the control unit 120 stores the playback method (delivery method) included in the call recording playback request in the "playback method" field of the playback management information database 134. Further, the control unit 120 updates the playback date and time field. Further, the control unit 120 updates the "playback information" field of the playback management information database 134 to "played" when the delivery of all recording data for the designated call (in this case, the call 1-A) is completed. Further, the control unit sets the "playback information" to "partially played", and records the range (playback range) in the "playback information" when only a portion of the recording data for the call is delivered. As described above, the "playback method", the "playback date and time", and the "playback information" may be associated with each other and recorded (additionally recorded) in the playback management information database 134 each time the recording data is played back a plurality of times. In that case, the control unit 120 may determine the playback status of the terminal apparatus 200 by referring to the latest "playback information". Further, the control unit 120 may determine that the larger the number of times that the terminal apparatus 200 plays back the recording of a given call ID (the same recording data is played back a larger times of times), the more sufficiently the call content is communicated to the user. The transmission unit 112 does not deliver the recording data when the control unit 120 determines not to permit playback, although the feature is omitted in FIG. 15. Absence of transmission of the recording data in the event of a failure to meet the predetermined condition is a type of playback control on the recorded data in which the call is recorded. In this case, a message indicating playback refusal may be communicated from the system management apparatus 100 to the terminal apparatus 200. The embodiment is not limited to this, and the timer may be started after the transmission of a call recording playback request on the side of the terminal apparatus 200, and the recording playback process may be terminated in the absence of the delivery of recording data.

Figure 16:
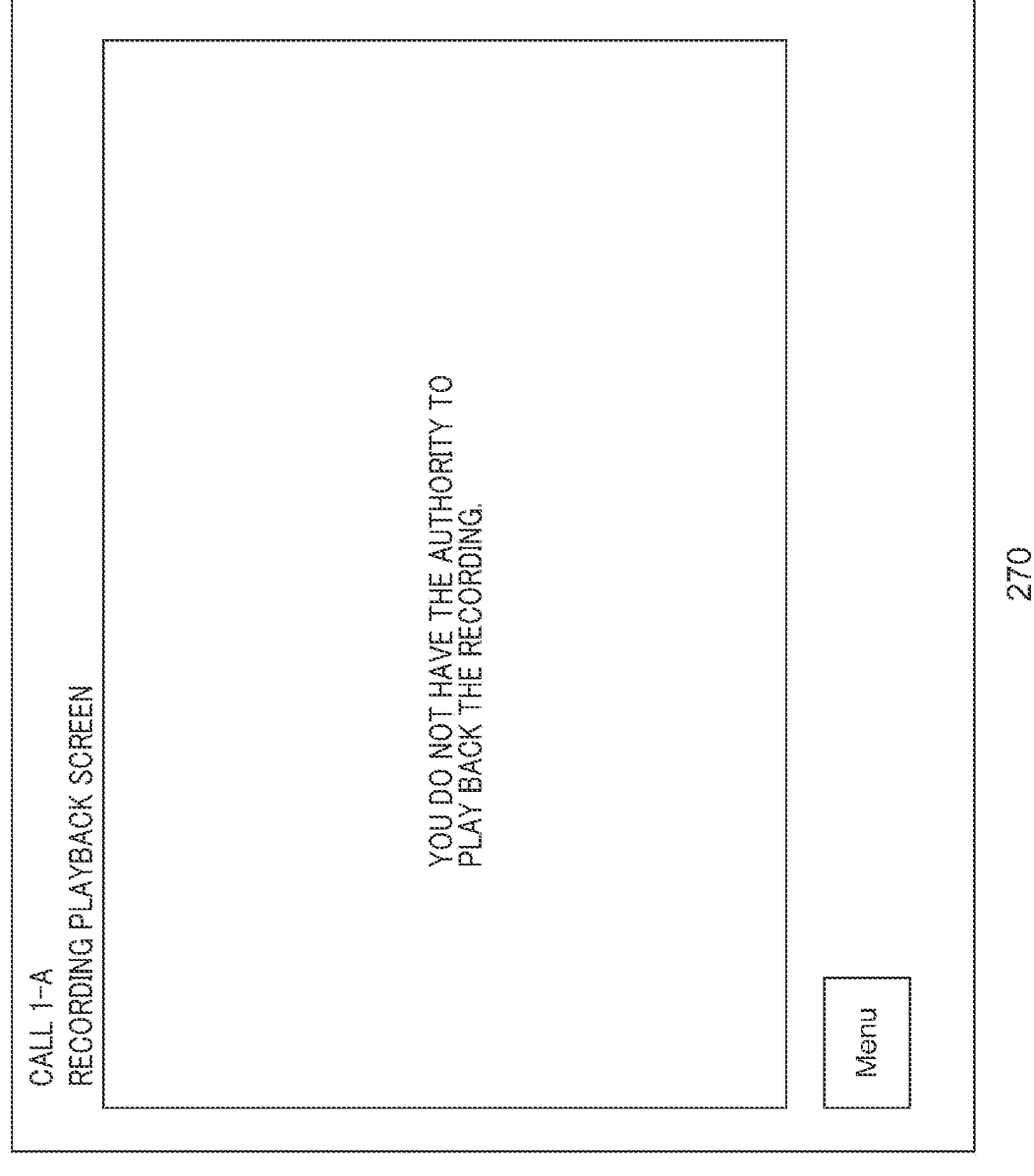
FIG. 16 shows another screen to play back the recording displayed on the display unit of the terminal apparatus.

FIG. 16 shows another screen related to recording playback displayed on the display unit 270 of the terminal apparatus 200. This shows an example of the screen displayed in the terminal apparatus 200 when the control unit 120 does not permit playback of the recording of the call 1-A. For example, a message such as "you do not have the authority to play back the recording" is displayed. Alternatively, the system management apparatus 100 may transmit a message indicating the reason for not permitting playback and information in the playback management information database 134 to the terminal apparatus 200, and the control unit 220 may display a corresponding message on the display unit 270. For example, a message such as "cannot be played back because the playback deadline (Mar. 5, 2021, 10 o'clock) has passed" may be displayed.

In this way, the control unit 120 controls playback of recorded data in which the call is recorded and updates the playback management information database 134 of the storage unit 130 in response to the playback request acquired from the terminal apparatus 200. When the control unit 120 acquires a playback request from the terminal apparatus 200 and permits playback, in particular, the control unit 120 updates the playback date and time for the terminal apparatus 200. Further, when the control unit 120 acquires a playback request from the terminal apparatus 200 and permits playback, the control unit 120 updates the playback information for the terminal apparatus 200. Further, the control unit 120 transmits the playback management information read from the storage unit 130 as group participation information to the terminal apparatus 200 via the transmission unit 112. As described above, the control unit 120 may transmit the group participation information to the terminal apparatus 200 at an arbitrary point of time. That is, as described above, the group participation information may be transmitted at a point of time when the playback management information update request is received from the terminal apparatus 200, or the updated group participation information may be transmitted at a point of time of transmitting the sound data in response to the call recording playback request. Further, the control unit 120 may, when it receives a call recording playback request from a certain terminal apparatus 200 (given terminal apparatus) and transmits sound data to the given terminal apparatus, transmit the updated group participation information to the given terminal apparatus or transmit the updated group participation information to the terminal apparatuses 200 other than the given terminal apparatus via the transmission unit 112. For example, the control unit 120 may, when it receives a call recording playback request from the fifth terminal apparatus 200e and transmits sound data to the fifth terminal apparatus 200e, transmit group participation information to the fifth terminal apparatus 200e or transmit group participation information to the other terminal apparatuses 200 concerned with the group call (the first terminal apparatus 200a, the second terminal apparatus 200b, etc.). That is, the control unit 120 may synchronously or asynchronously control playback of recorded data in which the call is recorded and transmission (provision) of group participation information to the terminal apparatus 200.

(5) Process to Change Authority

Figure 17:
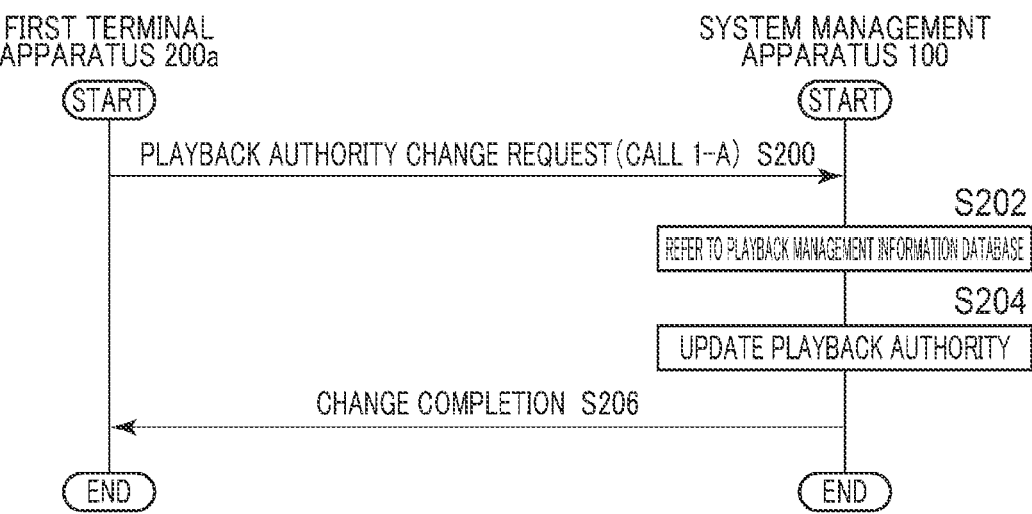
FIG. 17 is a sequence chart showing steps for changing the playback authority in the wireless communication system.

In the description so far, the members who have the authority to play back the recording are limited to those who have selected "recording" as the form of participation, but the user of the call originating terminal may be allowed to designate a member who has playback authority. FIG. 17 is a sequence chart showing steps for changing the playback authority in the wireless communication system 1000. This shows an example of the flow of the process in which the first terminal apparatus 200a requests the system management apparatus 100 to change the authority to play back the recording of a call. The control unit 220 of the first terminal apparatus 200a displays a user operation screen on the display unit 270 to change the authority to play back the recording. FIG. 18 shows a screen for authority change displayed on the display unit 270 of the terminal apparatus 200. This is an example of the user operation screen displayed by the first terminal apparatus 200a for which the authority to play back the call 1-A is changed. The control unit 220 refers to the playback management information database 234 and displays information related to the playback authority on the display unit 270. In FIG. 18, the message "select a member who can play back the recording of the call 1-A." is displayed. The check box "playback authority", the terminal apparatus ID, the participation form, and the playback authority are displayed.

The "playback authority" check box when checked (black in this figure) indicates that the recording can be played back and indicates, when not checked (white in this figure), that the recording cannot be played FIG. 18 shows that the recording playback authority has already been granted to the fifth terminal apparatus 200e, the sixth terminal apparatus 200f, and the seventh terminal apparatus 200g, and the playback authority is newly granted (added) to the first terminal apparatus 200a and the third terminal apparatus 200c. By using the screen, the user can grant the playback authority to any member or revoke the playback authority of any member. A playback deadline is set for the terminal apparatus 200 to which the playback authority has been granted. For example, the playback deadline of the first terminal apparatus 200a and the third terminal apparatus 200c is newly set. The playback deadline may be the one that was set for the other terminal apparatus 200 at the time of the call, may be set automatically according to a predetermined rule, or may be set by the user in the user operation screen. The predetermined rule may be, for example, a predetermined time after (twenty-four hours after, etc.) the end of the group call, a predetermined time after (twelve hours after, etc.) the time of granting the playback authority, a predetermined time before (one hour before) the start of the next group call, etc. Alternatively, the same playback deadline may be set for all terminal apparatuses 200, or different playback deadlines may be set for different terminal apparatuses 200. Further, the playback deadline of a member who has already been granted the playback authority may be changed (edited) in the user operation screen. Reference is made back to FIG. 17.

In step S200, the first terminal apparatus 200a transmits a "playback authority change request" to the system management apparatus 100 to change the authority to play back the recording of a call. This is done by pressing the "UPDATE" button in FIG. 18. The playback authority change request includes information designated in the user operation screen of FIG. 18. Specifically, the request includes the call ID, the terminal apparatus ID of each terminal apparatus 200 concerned with the call, and the playback authority of each terminal apparatus 200. Further, information on the playback deadline may be included in the playback authority change request. In step S202, when the reception unit 114 of the system management apparatus 100 receives the playback authority change request for the call 1-A, the control unit 120 refers to the playback management information database 134 and detects the difference from the playback authority change request. In step S204, the control unit 120 updates the playback authority information for the designated call ID. Specifically, the control unit 120 updates the data for the portion where the difference is detected in step S202, based on the playback authority change request. When the control unit 120 completes updating the playback authority, the transmission unit 112 transmits information indicating "change completion" to the first terminal apparatus 200a in step S206.

In the above-described description, it is assumed that the first terminal apparatus 200a, which is a call originating terminal, can change the playback authority, but the embodiment is not limited to this. For example, a group administrator, etc. may be able to change the playback authority. Alternatively, any member who participates in the group call may be able to change the playback authority.

According to this embodiment, the playback management information on the group call is centrally managed, and the playback management information is transmitted to the terminal apparatus. Therefore, detailed and accurate information about transmission of information on the group call can be communicated to the user. In particular, the user can accurately grasp the playback status (e.g., who, how, and when the recording of a group call was heard, or who has not heard the recording) of other members related to the recorded data in which the call is recorded. Further, since the user can grasp the playback status of other members related to the recorded data, the user can easily grasp the status of information transmission to other members. In addition, since the status of information transmission to other members is grasped, the user (talker) can appropriately select a topic (content of talk) in the next group call. In addition, since the user (talker) selects a topic appropriately, the group call can be executed efficiently. For example, when the user knows that "all members who did not participate in the previous group call in real time have played the recording by the time of the current group call", the user does not need to repeat the same talk or check whether the information has been communicated to individual members.

Further, the playback management information at least includes information on the playback date and time of the recorded data (sound data) for each terminal apparatus, and, when a playback request is acquired from the terminal apparatus, the playback date and time for the terminal apparatus is updated so that the playback management information can be updated to the latest state. In addition, since the playback management information is updated to the latest state, the playback status of other members can be accurately communicated to the user. Further, since participation form information indicating the form of participation in the group call is acquired from each terminal apparatus at the start of the group call, the management apparatus can accurately record the participation form of each terminal apparatus in the playback management information. Further, when the terminal apparatus receives a portion of the playback management information as group participation information, the playback status is displayed for each of the plurality of terminal apparatuses, so that the playback status of other members can be communicated to the user in an easy-to-understand and detailed manner.

In addition, since the participation form of each member is determined before the group call starts, the group call can be executed efficiently. If there is a member who participates in the middle of a group call, for example, it is necessary to explain the call content thus far to that member, which tends to create the waste of repeating the same talk. In addition, if it is not known which member will participate in the middle and at what point of time, it may be difficult for the talker to decide the appropriate content of talk. According to this embodiment, since the member cannot participate in the group call in the middle, less waste is created in the call, and the call can be executed efficiently. In addition, it is possible to know during a group call which member will hear the recording later, and so the talker can decide what to say appropriately based on the recognition. For example, the talker can appropriately decide the content of talk appropriately. For example, the talker may leave a message (instruction or request) during the call to members who will hear the recording later and not leave a message to members who will not hear the recording later.

Embodiment 2

Embodiment 2 will now be described. In embodiment 2, the terminal apparatus 200 that did not play back the recording by the playback deadline is controlled so that it cannot participate in the group call in real time in the next group call.

Figure 19:
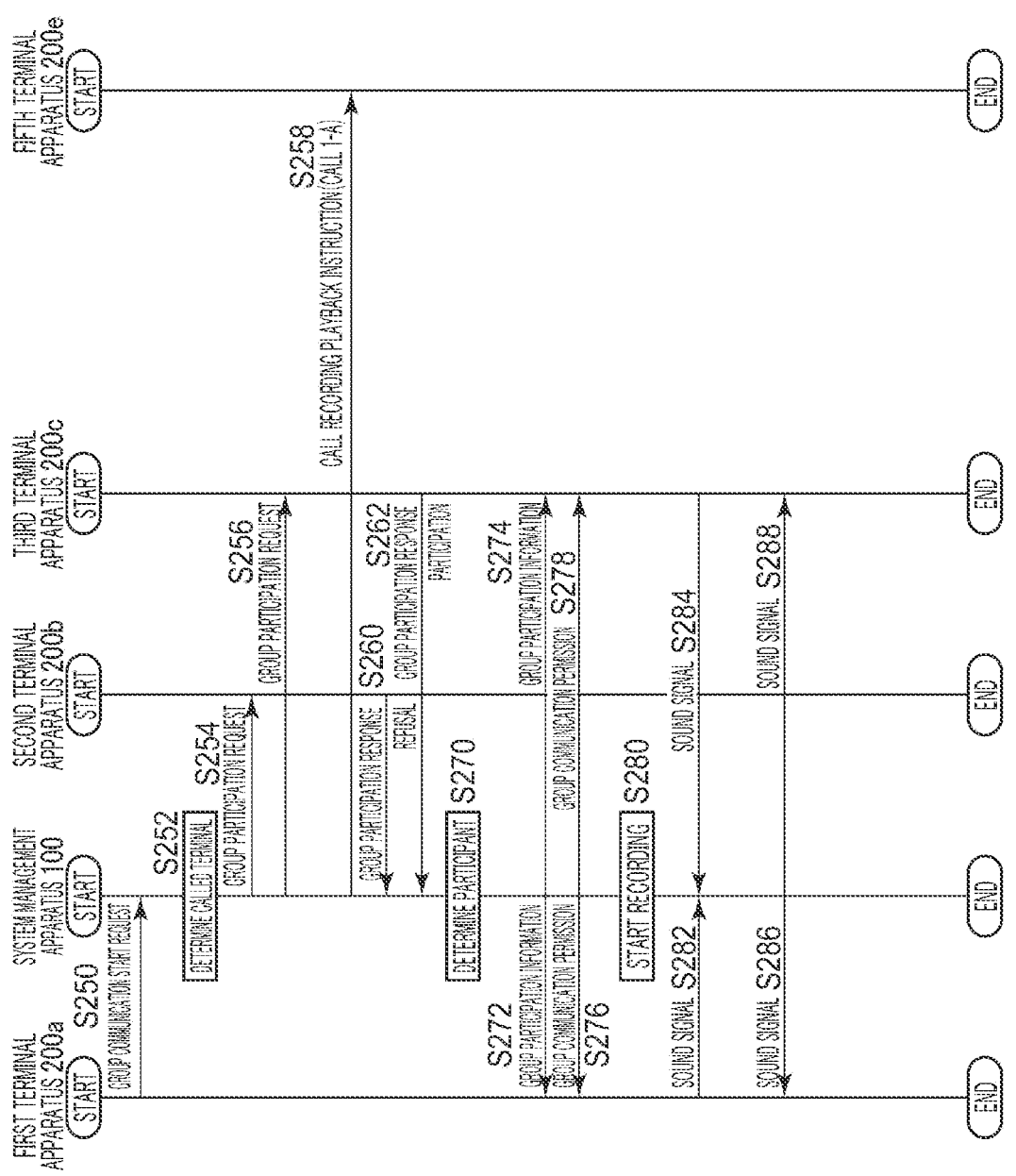
FIG. 19 is a sequence chart showing steps in a group call in the wireless communication system according to embodiment 1.

FIG. 19 is a sequence chart showing steps in a group call in the wireless communication system 1000. This is a process for controlling the terminal apparatus 200 that did not play back the recording by the playback deadline to be prohibited from participating in the next group call in real time. The first terminal apparatus 200a, which is a call originating terminal, and the second terminal apparatus 200b, the third terminal apparatus 200c, and the fifth terminal apparatus 200e, which are called terminals, belong to the same group. For the sake of brevity, the other terminal apparatuses 200 are omitted.

In step S250, the transmission unit 212 of the first terminal apparatus 200a transmits a group communication start request. In step S252, when the reception unit 114 of the system management apparatus 100 receives the group communication start request from the first terminal apparatus 200a, the control unit 120 refers to the terminal apparatus database 132 of the storage unit 130 and searches for the terminal apparatuses 200 to be called, i.e., the terminal apparatuses 200 other than the call originating terminal belonging to the group designated by the group communication start request. In FIG. 19, the second terminal apparatus 200b, the third terminal apparatus 200c, and the fifth terminal apparatus 200e are retrieved by the search. It is assumed below that the second terminal apparatus 200b and the third terminal apparatus 200c have played back the recording by the playback deadline or do not need to play back the recording, and that the fifth terminal apparatus 200e has not played back the recording by the playback deadline. The control unit 120 determines the terminal apparatus 200 to which a group participation request is delivered, based on the search result.

The control unit 120 then refers to the playback management information database 134 of the storage unit 130 and searches for (extracts) the terminal apparatus 200 that has not played back the recording by the playback deadline. If there is a terminal apparatus 200 that has not played back the recording by the playback deadline, it is excluded from real-time participation. A group participation request is transmitted to the terminal apparatus 200 that can participate in the group call in real time. Referring to FIG. 19, a group participation request is transmitted to the second terminal apparatus 200b in step S254 and to the third terminal apparatus 200c in step S256. A call recording playback instruction is transmitted to the terminal apparatus 200 that cannot participate in group communication in real time. The call recording playback instruction is also referred to as a playback instruction or a participation form instruction. Referring to FIG. 19, the fifth terminal apparatus 200e has not played back the recording by the playback deadline so that a call recording playback instruction is transmitted to the fifth terminal apparatus 200e in step S258. The call recording playback instruction message includes the call ID (in this case, call ID "1-A") of the call for which the recording should be played back.

The reception unit 214 of the second terminal apparatus 200b and the third terminal apparatus 200c receives the group participation request. When the reception unit 214 of the fifth terminal apparatus 200e receives a call recording playback instruction, the control unit 220 displays a message on the display unit 270. FIG. 20 shows a screen for an incoming call displayed on the display unit 270 of the fifth terminal apparatus 200e. This is an example of the screen (incoming call screen) displayed by the terminal apparatus 200 that has received a call recording playback instruction. The incoming call screen includes, for example, a message such as "You have been asked to participate in a call in group 1, but you cannot participate in real time because you have not played back the recording of the previous group call. Please play back the recording of the previous call and then play back the recording of the current call". In step S260, the second terminal apparatus 200b transmits a group participation response to the system management apparatus 100, and the subsequent process is the same as described with reference to FIG. 8 so that a description thereof is omitted. The fifth terminal apparatus 200e does not transmit the group participation response to the system management apparatus 100, but the system management apparatus 100 sets the participation form of the fifth terminal apparatus 200e to "recording" and records it in the playback management information database 134. That is, the control unit 120 configures the form of participation of the terminal apparatus 200, to which the call recording playback instruction is transmitted, in a new call ID to be "recording", sets the playback information to be "unplayed", and records the information in the playback management information database 134 accordingly. The control unit 120 also records the playback deadline.

In this way, by transmitting a call recording playback instruction from the system management apparatus 100 to the terminal apparatus 200 instead of a group participation request, the terminal apparatus 200 that did not play back the recording by the playback deadline is controlled so that it cannot participate in the group call in real time in the next group call. By performing such communication control, it is possible to make the members of the group aware "we should make sure to play back the call recording by the playback deadline". In particular, setting the playback deadline at a point of time before the next group call prompts the members to play back the recording of the previous call by the time of the next group call and ensures that the information on the previous call is properly transmitted to the members, so that the next group call can be executed efficiently.

Alternatively, the system management apparatus 100 may send a message to prompt for playback of the recording in order to notify the terminal apparatus 200 that the playback deadline is approaching.

As described above, the playback management information database 134 includes information indicating at least whether the sound data has been played back and information on the playback deadline. The control unit 120 refers to the playback management information database 134 to extract the terminal apparatus 200 that has not played back the sound data by the playback deadline and restricts the extracted terminal apparatus 200 from participating in a group call made after the playback deadline.

Figure 21:
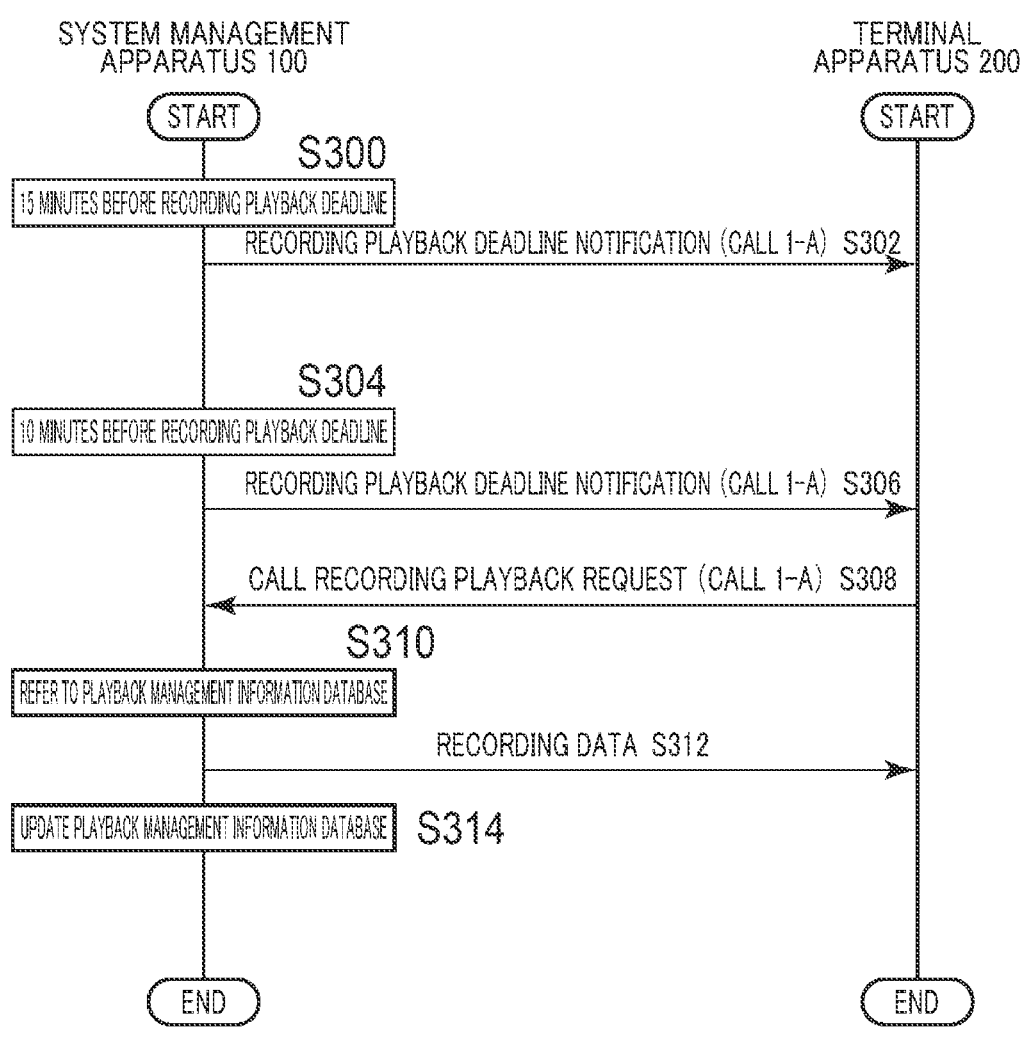
FIG. 21 is a sequence chart showing steps of notification in the wireless communication system according to embodiment 2.

The process for notifying the terminal apparatus 200 that has not played back the recording of information (alert) for promoting playback in a situation where the playback deadline is approaching will now be described. FIG. 21 is a sequence chart showing steps of notification in the wireless communication system 1000. This is an example of the process in which the system management apparatus 100 transmits a recording playback deadline notification to the terminal apparatus 200 when the terminal apparatus 200 does not play back the recording even at point of time a predetermined time before the playback deadline for the recording. In this case, the predetermined time is fifteen minutes, but the embodiment is not limited to this of course. In step S300, the control unit 120 of the system management apparatus 100 refers to the playback management information database 134 fifteen minutes before the recording playback deadline and searches for the terminal apparatus 200 whose playback information is "unplayed" or "partially played" as the terminal targeted for notification. In step S302, the transmission unit 112 transmits a recording playback deadline notification to the terminal targeted for notification, based on the search result. The recording playback deadline notification includes the call ID (in this case, the call ID "1-A") of the call for which the terminal apparatus 200 should play back the recording. Further, the date and time of the playback deadline may be included in the recording playback deadline notification. Further, the recording playback deadline notification may include information on the terminal apparatus 200 that has already played back the recording of the call and information on the user. The recording playback deadline notification is also referred to as a playback deadline notice or a playback reminder notice.

When the reception unit 214 of the terminal apparatus 200 receives the recording playback deadline notification, the control unit 220 displays a message for prompting playback on the display unit 270. FIG. 22 shows a screen to prompt playback displayed on the display unit 270 of the terminal apparatus 200. This is an example of the screen (playback reminder screen) displayed by the terminal apparatus 200 that has received a recording playback deadline notification. For example, the playback reminder screen includes, for example, a message such as "The deadline to play back the recording is approaching. Please play back the recording. Fifteen minutes before". When the recording playback deadline notification includes information on the terminal apparatus 200 that has completed the playback, a message such as "The terminal apparatus 200-6 and the terminal apparatus 200-7 have already played back the recording. Please play back the recording within fifteen minutes for efficient execution of the group call" may be displayed. To play back the recording, the user presses the "OK" button in FIG. 22, and presses the "CANCEL" button to proceed without playing back the recording. Reference is made back to FIG. 12.

In step S304, ten minutes before the recording playback deadline, the control unit 120 refers to the playback management information database 134 and searches for the terminal apparatus 200 with playback information "unplayed" or "partially played" as the terminal targeted for notification. In the example shown in FIG. 21, the playback information remains "unplayed" or "partially played" at this point of time. That is, the "OK" button in FIG. 22 has not been pressed and the user has not played back the recording. For this reason, the control unit 120 transmits a recording playback deadline notification to the terminal targeted for notification in step S306. That is, the same process as in steps S300 and S302 is performed at a predetermined cycle until the terminal apparatus 200 plays back the recording. In step S308, the transmission unit 212 transmits a call recording playback request to the system management apparatus 100 when the user of the terminal apparatus 200 presses the "OK" button of FIG. 22.

In step S310, when the reception unit 114 of the system management apparatus 100 receives the call recording playback request, the control unit 120 refers to the playback management information database 134 and acquires a sound data URL. In step S312, the control unit 120 transmits the recording data to the terminal apparatus 200 based on the acquired sound data URL. When the reception unit 214 of the terminal apparatus 200 receives the recording data, the control unit 220 plays back the recording data and outputs it from the speaker 250. In step S314, the control unit 120 of the system management apparatus 100 updates the playback management information database 134.

When the user of the terminal apparatus 200 presses the "CANCEL" button shown in FIG. 22, the transmission of the recording playback deadline notification is stopped, but the terminal apparatus 200 is unable to participate in the next group call in real time. In this way, transmission of a recording playback deadline notification from the system management apparatus 100 to the terminal apparatus 200 prompts the user to play back the recording data by the playback deadline. The method of prompting playback described above is by way of example only, and the embodiment is not limited to this. The terminal apparatus 200 may periodically acquire the playback deadline in the playback management information database 234 and output a message screen as shown in FIG. 22 to the display unit 270 when the playback deadline approaches.

According to this embodiment, the playback management information is referred to in order to extract a terminal apparatus that has not played back the sound data for the call recording by the playback deadline, and the extracted terminal apparatus is restricted from participation in the group call made after the playback deadline. Therefore, the user who does not know the content of the previous group call can be excluded from the group call. Since the user who does not know the content of the previous group call is excluded from the group call, the group call can be executed efficiently.

Given above is an explanation of embodiments of the present disclosure, but the embodiments are not limited by the details of these embodiments. Further, the above-described constituting elements include those that can be easily conceived of by those skilled in the art, those that are substantially identical, and those that are in the range of so-called equivalents. The above-described constituting elements can also be combined as appropriate. Further, constituting elements may be omitted, replaced, or modified in a variety of manners without departing from the thrust of the embodiments described above.

The wireless communication system 1000 according to embodiments 1, 2 executes a group call for transmitting and receiving sound data as an example of group communication. However, the embodiments are not limited to this. For example, the wireless communication system 1000 may perform group communication for transmitting/receiving data such as images and videos. That is, the system management apparatus 100 may record a video call and generate information indicating the status of playback of recording in each terminal apparatus 200. In this case, the video data for a record of the video call will be recorded data in which the call is recorded, and the system management apparatus 100 manages the playback status of the terminal apparatus 200 (user) with respect to the recorded data. According to this variation, the flexibility of configuration can be improved.

The wireless communication system 1000 according to embodiments 1 and 2 uses the wireless access point 310 to perform wireless communication between the terminal apparatus 200 and the wireless access point 310. However, the embodiments are not limited to this. For example, the wireless access point 310 may not be used, and wired communication may be used between the terminal apparatus 200 and the network 300. That is, the communication system may be wired or wireless. The wireless communication system 1000 may use a network other than the IP network as the network 300. Further, the terminal apparatus 200 may be a cellular phone, a smartphone, a tablet terminal, a computer (personal computer), etc. Further, the terminal apparatus 200 does not necessarily have to be portable by the user and may not be movable. For example, the terminal apparatus 200 may be a desktop computer. Further, the wireless communication system 1000 (i.e., the communication system) may be a video call system (video conference system) using a personal computer, a smartphone, a tablet terminal, etc. as the terminal apparatus 200. According to this modification, the flexibility of configuration can be improved.

What is claimed is:

1. A management apparatus adapted to manage a group call made between a plurality of terminal apparatuses, comprising:
   a storage that stores playback management information that indicates, for each terminal apparatus concerned with the group call, a status of playback of recorded data in which the group call is recorded;
   a controller that controls playback of the recorded data and updates the playback management information in the storage in accordance with a playback request acquired from the terminal apparatus; and
   a transmitter that transmits the playback management information read from the storage to the terminal apparatus,
   wherein the playback management information includes information on a playback deadline to play back the recorded data,
   wherein the playback deadline is set to a point of time a predetermined time before a date and time when the next group call is scheduled to start, and
   wherein, when the controller acquires a playback request from the terminal apparatus after the playback deadline, the controller controls the recorded data not to be played back.

2. The management apparatus according to claim 1, wherein the controller sets, for the terminal apparatus that has not played back the recorded data in a past group call before the playback deadline, the playback deadline in a new group call to a point of time before the playback deadline in the new group call for the terminal apparatus that has played back the recorded data before the playback deadline in the past group call.

3. The management apparatus according to claim 1, wherein the playback management information further includes identification information on the terminal apparatus, information on a date and time when the recorded data is played back, and information indicating a playback segment in the recorded data that has been played back, and
   wherein the transmitter transmits the playback management information to the terminal apparatus to cause the identification information on the terminal apparatus, the playback deadline, the playback date and time, and the playback segment to be displayed on the terminal apparatus such that the identification information on the terminal apparatus, the playback deadline, the playback date and time, and the playback segment are associated with each other.

4. A management apparatus adapted to manage a group call made between a plurality of terminal apparatuses, comprising:
   a storage that stores playback management information that indicates, for each terminal apparatus concerned with the group call, a status of playback of recorded data in which the group call is recorded;

31 a controller that controls playback of the recorded data and updates the playback management information in the storage in accordance with a playback request acquired from the terminal apparatus; and a transmitter that transmits the playback management information read from the storage to the terminal apparatus, wherein the playback management information includes information on a playback deadline to play back the recorded data, and wherein the controller refers to the playback management information to extract a terminal apparatus that has not played back the recorded data by the playback deadline and prohibits the terminal apparatus thus extracted from participating in a group call made after the playback deadline.

5. The management apparatus according to claim 4, wherein the playback management information at least includes information on a playback date and time when the recorded data for each terminal apparatus concerned with the group call is played back and includes information indicating a playback segment that has been played back, and when the controller acquires a playback request from a terminal apparatus, the controller updates the information on the playback date and time and the information indicating the playback segment that are associated with the terminal apparatus.

6. The management apparatus according to claim 4, wherein the playback management information at least includes information on a playback method to play back the recorded data for each terminal apparatus concerned with the group call, wherein, when the controller acquires a playback request from a terminal apparatus, the controller updates the playback method for the terminal apparatus, and wherein the playback method includes information identifying whether the recorded data is played back at a normal playback speed or played back at a playback speed faster than normal.

7. The management apparatus according to claim 4, wherein the playback deadline is set to a point of time a predetermined time before a date and time when the next group call is scheduled to start, and wherein, when the controller acquires a playback request from the terminal apparatus after the playback deadline, the controller controls the recorded data not to be played back.

8. The management apparatus according to claim 4, wherein the controller sets, for the terminal apparatus that has not played back the recorded data in a past group call before the playback deadline, the playback deadline in a new group call to a point of time before the playback deadline in the new group call for the terminal apparatus that has played back the recorded data before the playback deadline in the past group call.

9. The management apparatus according to claim 4, wherein the playback management information includes identification information on the terminal apparatus, information on the playback deadline to play back the recorded data, information on a date and time when the recorded data is played back, and information indicating a playback segment in the recorded data that has been played back, and wherein the transmitter transmits the playback management information to the terminal apparatus to cause the identification information on the terminal apparatus, the playback deadline, the playback date and time, and the playback segment to be displayed on the terminal apparatus such that the identification information on the terminal apparatus, the playback deadline, the playback date and time, and the playback segment are associated with each other.

10. A management method adapted to manage a group call made between a plurality of terminal apparatuses, comprising:

storing, in a memory, playback management information that indicates, for each terminal apparatus concerned with the group call, a status of playback of recorded data in which the group call is recorded;

controlling playback of the recorded data and updating the playback management information in the memory in accordance with a playback request acquired from the terminal apparatus; and transmitting the playback management information read from the memory to the terminal apparatus, wherein the playback deadline is set to a point of time a predetermined time before a date and time when the next group call is scheduled to start, and wherein, when the controlling acquires a playback request from the terminal apparatus after the playback deadline, the controlling controls the recorded data not to be played back.

11. The management method according to claim 10, wherein the updating sets, for the terminal apparatus that has not played back the recorded data in a past group call before the playback deadline, the playback deadline in a new group call to a point of time before the playback deadline in the new group call for the terminal apparatus that has played back the recorded data before the playback deadline in the past group call.

12. The management method according to claim 10, wherein the playback management information further includes identification information on the terminal apparatus, information on a date and time when the recorded data is played back, and information indicating a playback segment in the recorded data that has been played back, and wherein transmitting transmits the playback management information to the terminal apparatus to cause the identification information on the terminal apparatus, the playback deadline, the playback date and time, and the playback segment to be displayed on the terminal apparatus such that the identification information on the terminal apparatus, the playback deadline, the playback date and time, and the playback segment are associated with each other.

* * * * *